United States Patent
Yoshida et al.

(10) Patent No.: US 9,201,623 B2
(45) Date of Patent: *Dec. 1, 2015

(54) CONTROL DEVICE AND IMAGE FORMING APPARATUS WITH TWO CONTROLLERS

(71) Applicant: FUJI XEROX CO., LTD., Tokyo (JP)

(72) Inventors: Kinichi Yoshida, Kanagawa (JP); Yasuaki Mitobe, Kanagawa (JP); Shigekazu Yamagishi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/486,479

(22) Filed: Sep. 15, 2014

(65) Prior Publication Data

US 2015/0006773 A1    Jan. 1, 2015

Related U.S. Application Data

(63) Continuation of application No. 13/684,354, filed on Nov. 23, 2012, now Pat. No. 9,013,731.

(30) Foreign Application Priority Data

Jun. 15, 2012  (JP) ................. 2012-135920

(51) Int. Cl.
*G06K 15/00* (2006.01)
*G06F 3/12* (2006.01)
(Continued)

(52) U.S. Cl.
CPC .............. *G06F 3/1296* (2013.01); *G06F 13/24* (2013.01); *G06F 13/287* (2013.01);
(Continued)

(58) Field of Classification Search
CPC ............. G06F 3/1296; H04N 1/32587; H04N 1/32598; H04N 2201/0082; H04N 1/32593; G06K 15/18
USPC .......................................... 358/1.15, 1.14, 1.1
See application file for complete search history.

(56) References Cited

U.S. PATENT DOCUMENTS 5,485,246 A * 1/1996 Hayashi et al. .................. 399/1
2007/0071479 A1  3/2007 Semma et al.

FOREIGN PATENT DOCUMENTS

JP    H04-80811 A    3/1992
JP    H06-237330 A   8/1994
(Continued)

OTHER PUBLICATIONS

Oct. 21, 2014 Office Action issued in Japanese Application No. 2014-139607.
(Continued)

*Primary Examiner* — Martin Mushambo
(74) *Attorney, Agent, or Firm* — Oliff PLC

(57) ABSTRACT

A control device includes an apparatus controller that is connected to at least one apparatus and includes a first memory which stores data for controlling the driving of the apparatus and data indicating a state of the apparatus and a reading and transmitting unit which reads each data item stored in the first memory and transmits the read data, a main controller that includes a central processing unit, a second memory, and a writing unit which writes the data transmitted from the apparatus controller to the second memory, and a full-duplex serial bus that connects the main controller and the apparatus controller. The reading and transmitting unit and the writing unit operate such that each data item stored in the first memory is read, transmitted, and stored in the second memory in a cycle equal to or less than a count cycle of a system timer.

6 Claims, 18 Drawing Sheets

(51) Int. Cl.
  *H04N 1/32*      (2006.01)
  *G06F 13/24*     (2006.01)
  *G06F 13/28*     (2006.01)
  *G06F 13/42*     (2006.01)

(52) U.S. Cl.
  CPC ........... *G06F 13/4282* (2013.01); *G06K 15/40* (2013.01); *H04N 1/32587* (2013.01); *H04N 1/32593* (2013.01); *H04N 1/32598* (2013.01); *G06F 2213/2424* (2013.01); *G06F 2213/2802* (2013.01); *H04N 2201/0082* (2013.01)

(56) References Cited

FOREIGN PATENT DOCUMENTS

| | | |
|---|---|---|
| JP | A-10-190900 | 7/1998 |
| JP | 2005-035229 A | 2/2005 |
| JP | A-2007-96660 | 4/2007 |
| JP | 2008-015739 A | 1/2008 |

OTHER PUBLICATIONS

Jun. 6, 2014 Office Action issued in U.S. Appl. No. 13/684,354.

\* cited by examiner

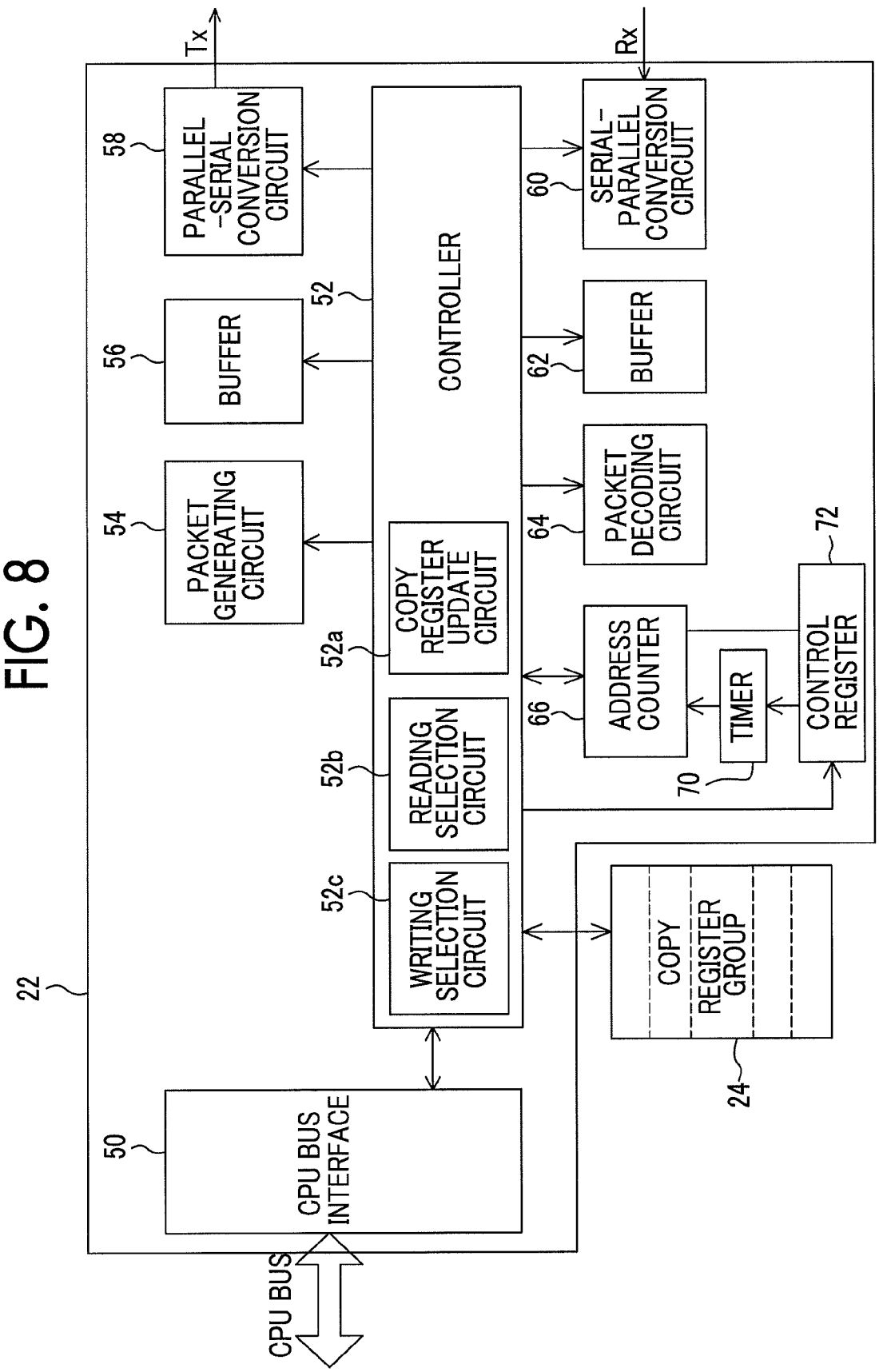

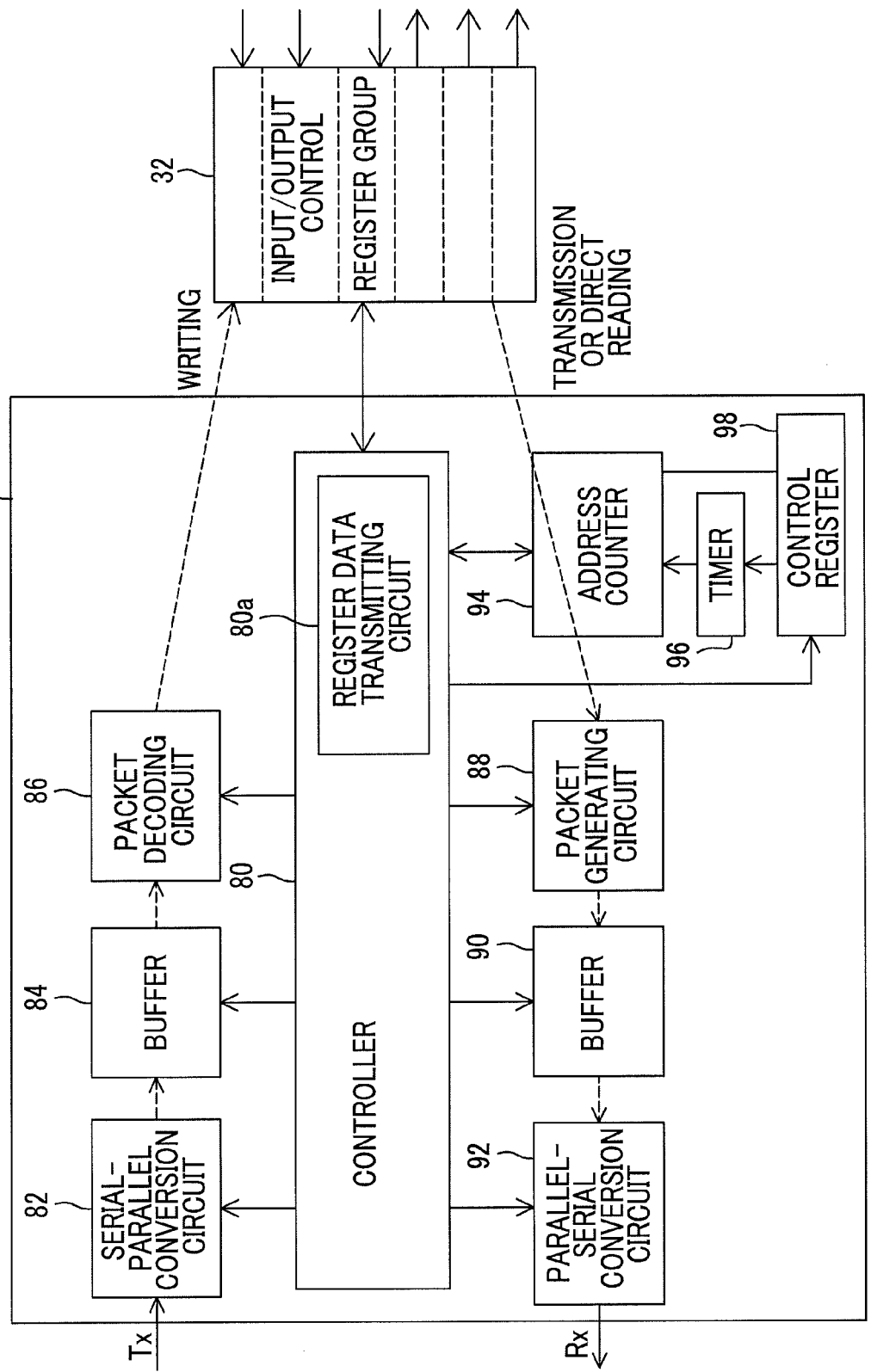

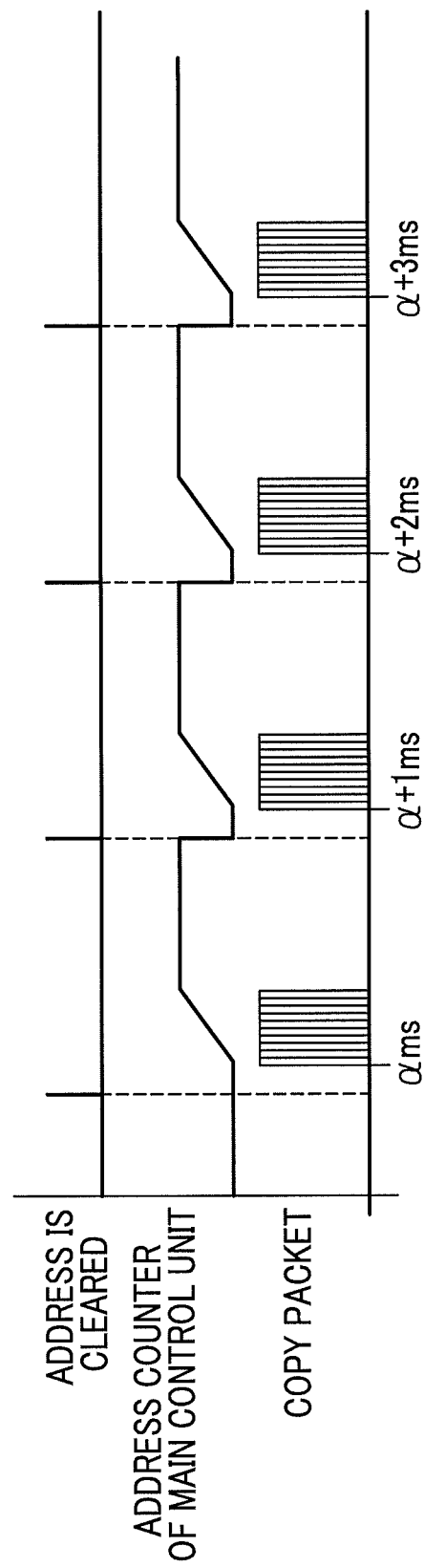

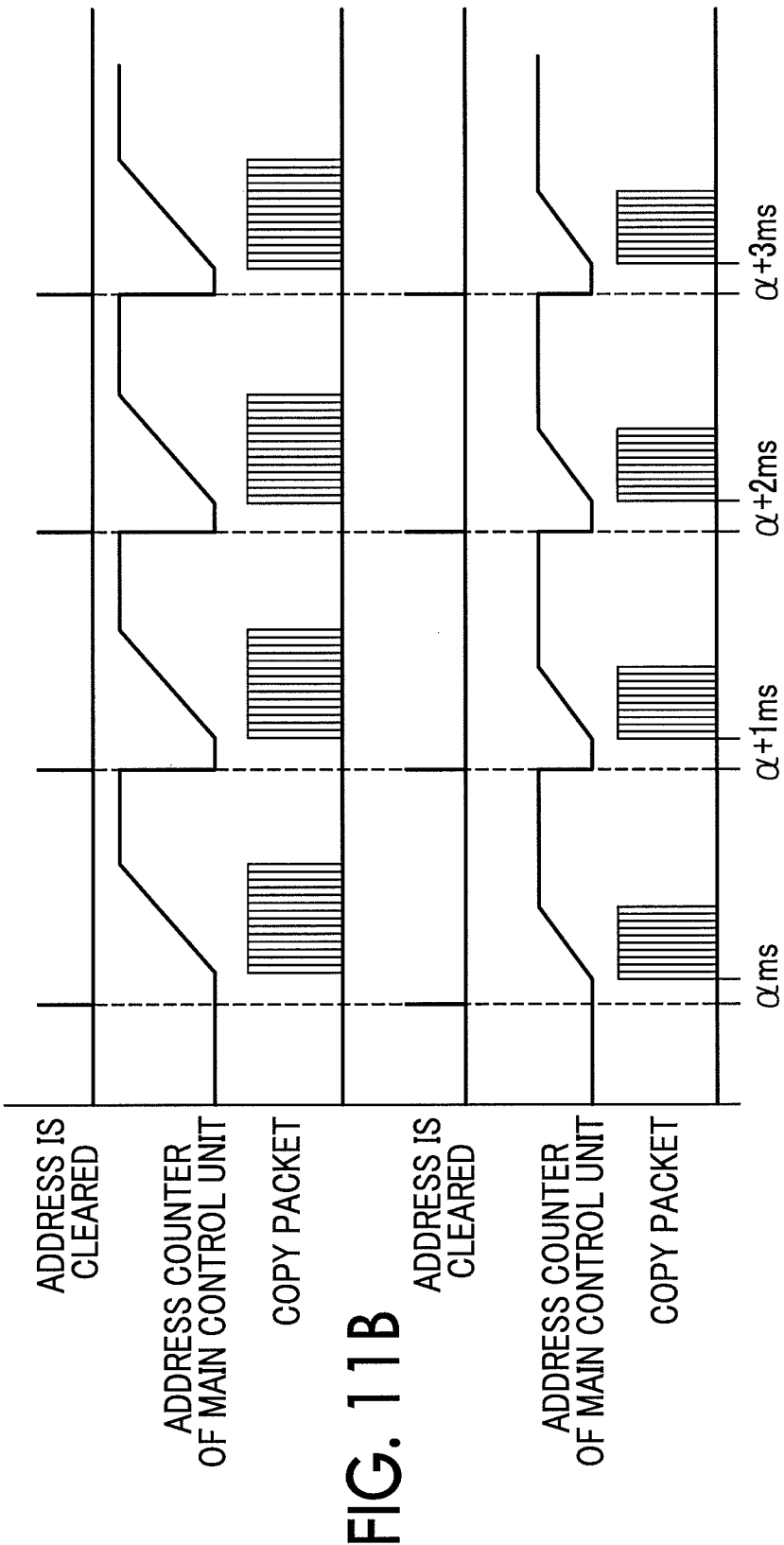

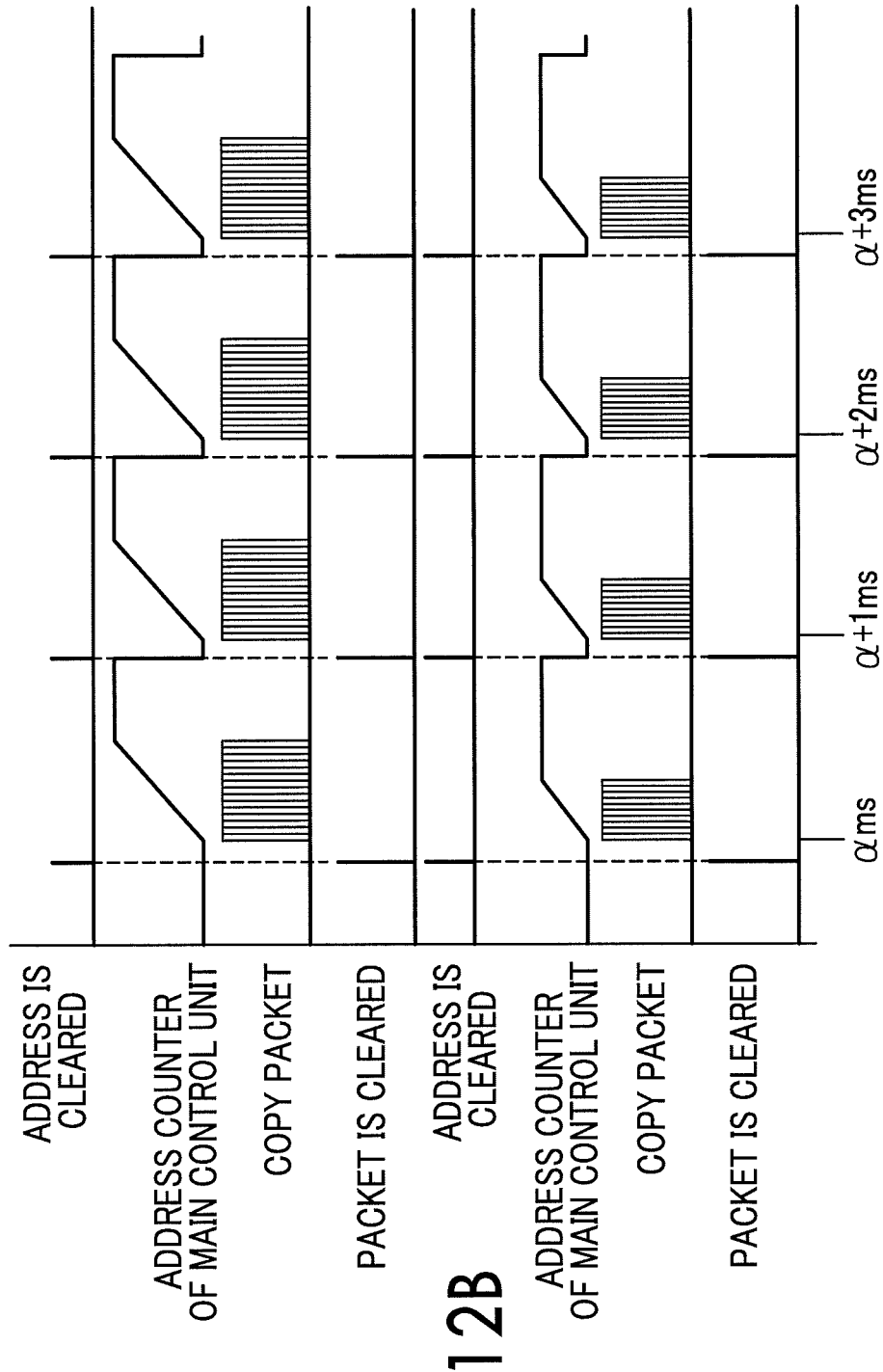

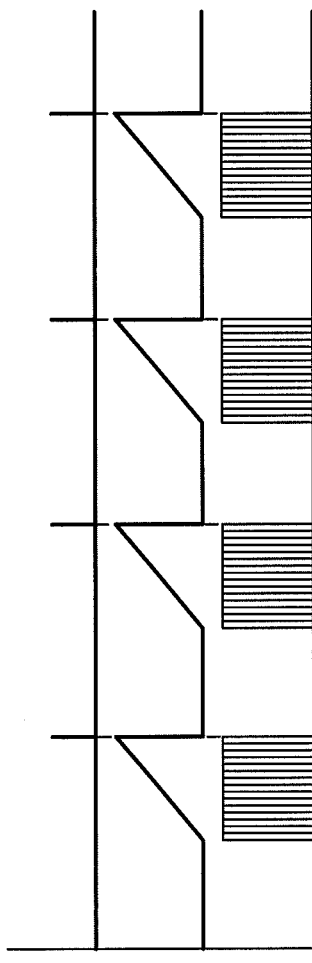
FIG. 15A
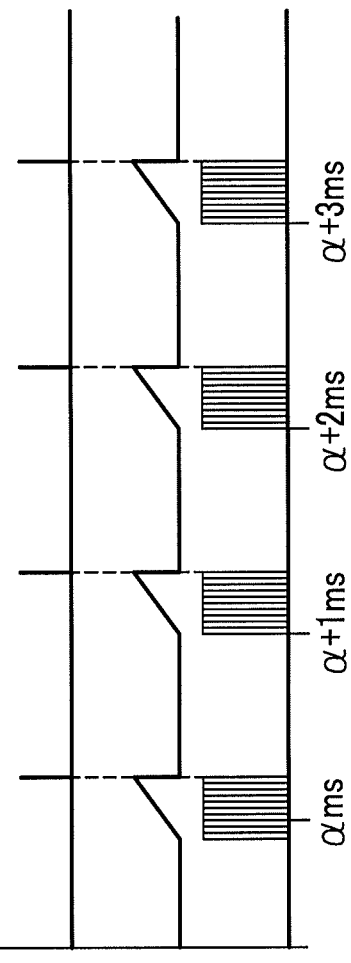
FIG. 15B
FIG. 15C
EXAMPLE OF DIVISION OF SIZE
| bit1 | bit0 | Mirror Size[kb] |
|---|---|---|
| 0 | 0 | 256 |
| 0 | 1 | 192 |
| 1 | 0 | 128 |
| 1 | 1 | 64 |

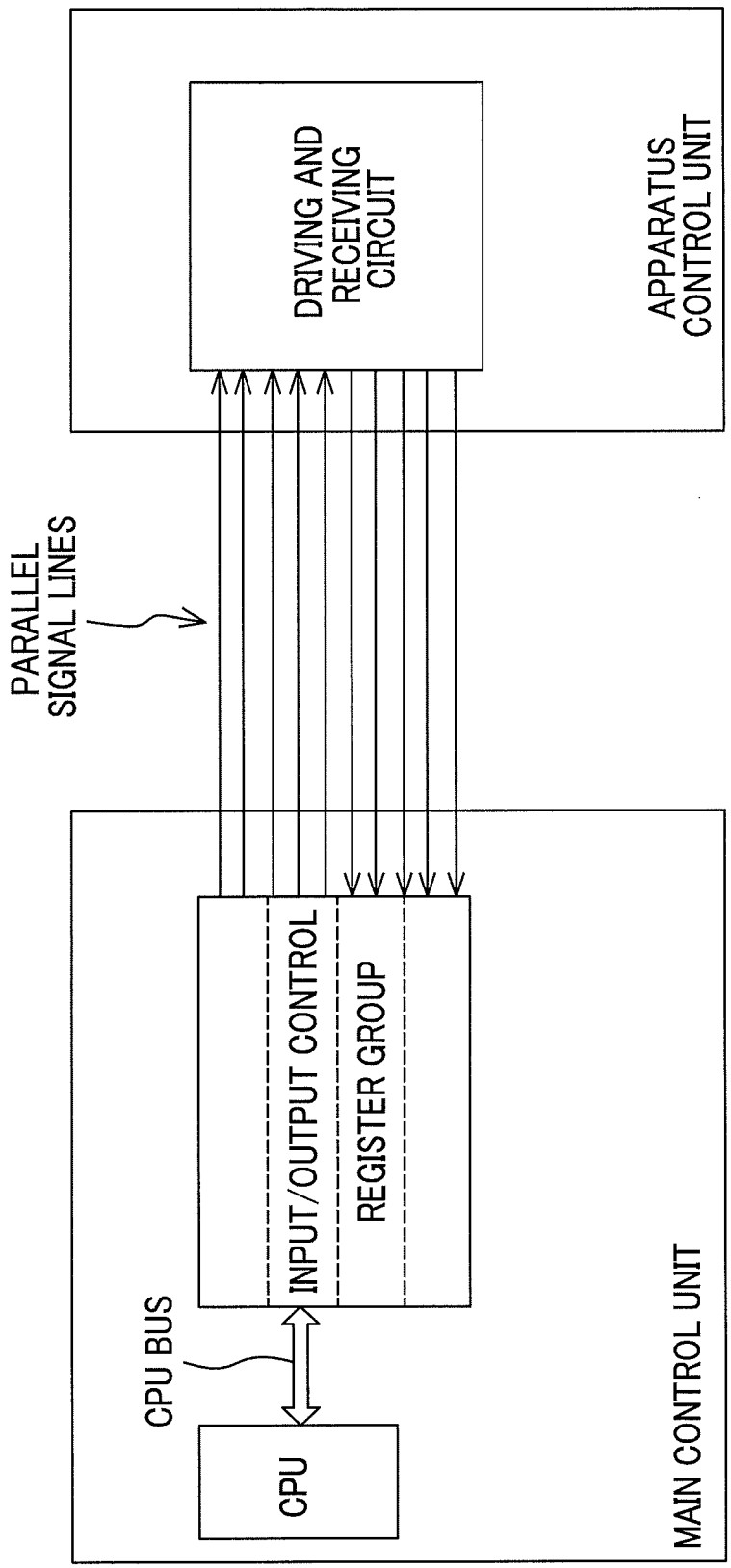

US 9,201,623 B2

CONTROL DEVICE AND IMAGE FORMING APPARATUS WITH TWO CONTROLLERS

CROSS-REFERENCE TO RELATED APPLICATIONS

This application is a continuation application of U.S. patent application Ser. No. 13/684,354 filed Nov. 23, 2012 which claims priority under 35 USC 119 from Japanese Patent Application No. 2012-135920 filed Jun. 15, 2012.

BACKGROUND

Technical Field

The present invention relates to a control device and an image forming apparatus.

SUMMARY

According to an aspect of the invention, there is provided a control device including: an apparatus controller that is connected to at least one apparatus and includes a first memory which stores data for controlling the driving of the apparatus and data indicating a state of the apparatus and a reading and transmitting unit which reads each data item stored in the first memory and transmits the read data; a main controller that includes a central processing unit, a second memory, and a writing unit which writes the data transmitted from the apparatus controller to the second memory; and a full-duplex serial bus that connects the main controller and the apparatus controller, wherein the reading and transmitting unit and the writing unit operate such that each data item stored in the first memory is read, transmitted, and stored in the second memory in a cycle equal to or less than a count cycle of a system timer, which is a standard for the operation of the central processing unit.

BRIEF DESCRIPTION OF THE DRAWINGS

Exemplary embodiments of the present invention will be described in detail based on the following figures, wherein:

FIG. 8 is a diagram illustrating the structure of a SerDes control unit of a main control unit according to the third exemplary embodiment;

FIG. 9 is a diagram illustrating the structure of a SerDes control unit of an apparatus control unit according to the third exemplary embodiment;

FIG. 10 is a timing chart illustrating the reset time of an address counter of the main control unit when method (1) is used in the third exemplary embodiment;

FIGS. 11A and 11B are timing charts illustrating the reset time of the address counter of the main control unit when method (2) is used in the third exemplary embodiment;

FIGS. 12A and 12B are timing charts illustrating the reset time of the address counter of the main control unit when method (3) is used in the third exemplary embodiment;

FIGS. 15A and 15B are timing charts illustrating the reset time of the address counter of the main control unit when method (6) is used in the third exemplary embodiment, and FIG. 15C is a diagram illustrating an example of the division of a memory size;

FIGS. 17A and 17B are diagrams illustrating the structure of a control device according to the related art.

DETAILED DESCRIPTION

Hereinafter, exemplary embodiments will be described in detail with reference to the accompanying drawings.

First Exemplary Embodiment

Figure 1:
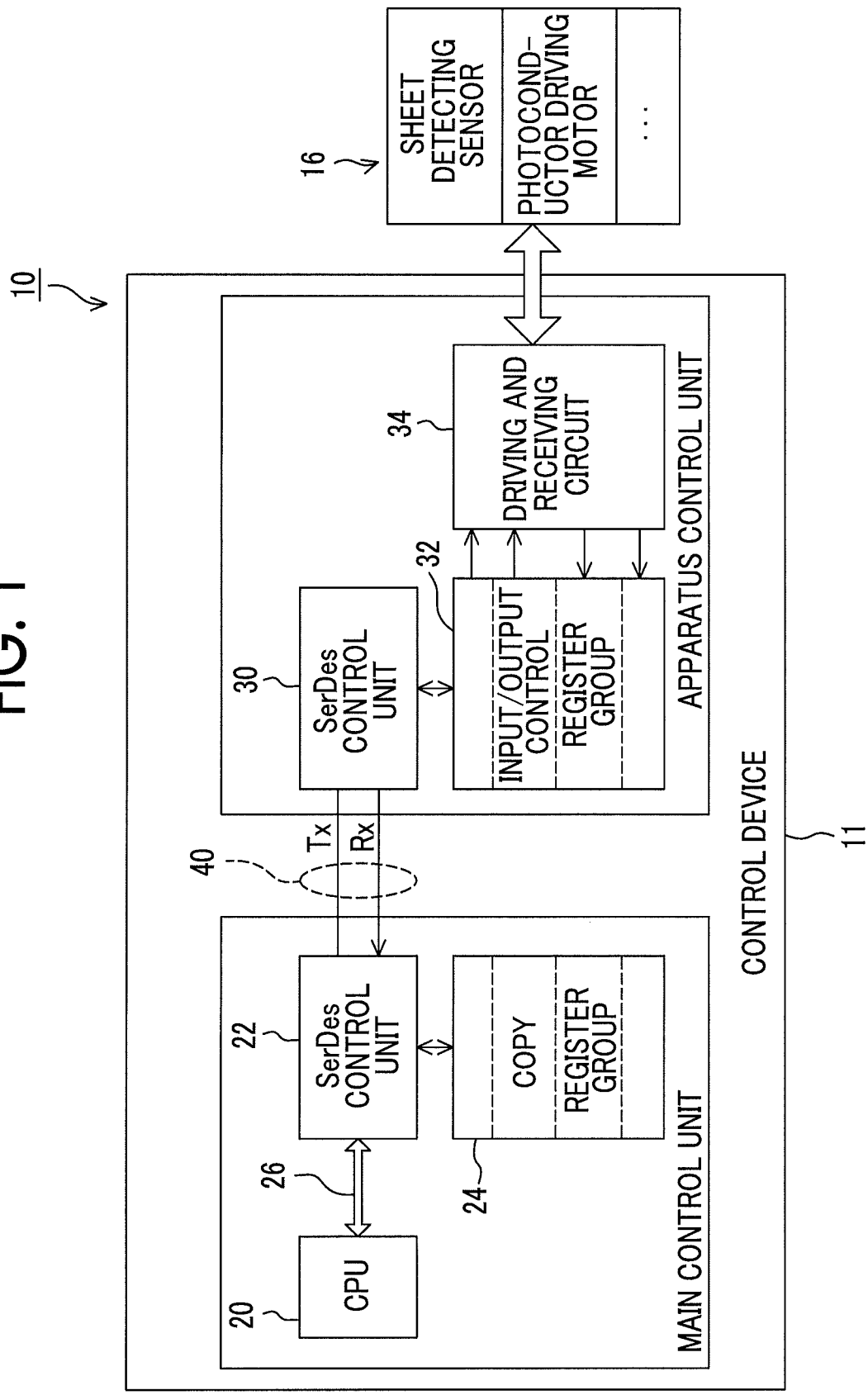
FIG. 1 is a diagram illustrating an example of the structure of image forming apparatuses according to first to third exemplary embodiments.

FIG. 1 is a diagram illustrating an example of the structure of an image forming apparatus 10 according to a first exemplary embodiment. The image forming apparatus 10 includes a control device 11 in which a main control unit 12 and an apparatus control unit 14 are connected to each other through a serial bus 40 and an apparatus group 16 including various apparatuses connected to the apparatus control unit 14. The serial bus 40 is a full-duplex transmission path which includes a signal transmission line Tx and a signal receiving line Rx as viewed from the main control unit 12.

The apparatuses included in the apparatus group 16 are for forming images and include, for example, a motor that rotates, for example, a photoconductor or a developing roller, a sensor that detects sheets, and a sensor that detects toner density. In this exemplary embodiment, the image forming apparatus 10 forms images using an electrophotographic method. However, the image forming apparatus 10 may form images using an ink-jet method.

The main control unit 12 includes a central processing unit (CPU) 20, a serializer and deserializer control unit 22 (hereinafter, referred to as a SerDes control unit 22), and a copy register group 24.

The CPU 20 executes a program stored in a non-volatile storage unit (not shown) to control the overall operation of the image forming apparatus 10. The storage unit which stores the program executed by the CPU 20 may be a hard disk drive (HDD), a flexible disk, a DVD disc, a magneto-optical disc, or a universal serial bus (USB) memory (not shown), or it may be a storage medium of another apparatus which is connected through a communication IF (not shown).

The CPU 20 is connected to the SerDes control unit 22 through a CPU bus 26. The CPU bus 26 is a parallel bus including plural signal lines.

When receiving information (parallel signals) transmitted from the CPU 20 to the apparatus control unit 14 through the CPU bus 26, the SerDes control unit 22 packetizes the parallel signals, converts each packet into serial signals, and transmits the serial signals to the apparatus control unit 14 through the serial bus 40. In addition, when receiving the serial packet from the apparatus control unit 14 through the serial bus 40, the SerDes control unit 22 converts the received packet into a parallel packet, decodes the parallel packet, and extracts data included in the packet.

The copy register group 24 is a memory including plural register (storage areas). The content of information stored in each register of an input/output control register group 32 which is included in the apparatus control unit 14 is copied to the copy register group 24. The term "copy" means a series of processes of reading data stored in the register of the input/output control register group 32, transmitting the read data to the main control unit 12 through the serial bus 40, and writing the data to each register of the copy register group 24.

The apparatus control unit 14 includes a serializer and deserializer control unit 30 (hereinafter, referred to as a SerDes control unit 30), the input/output control register group 32, and a driving and receiving circuit 34.

When receiving the serial packet from the main control unit 12 through the serial bus 40, the SerDes control unit 30 converts the received packet into a parallel packet, decodes the parallel packet, and extracts data included in the packet. In addition, the SerDes control unit 30 packetizes information (parallel signals) to be transmitted to the main control unit 12, converts each packet into serial signals, and transmits the serial signals to the main control unit 12 through the serial bus 40.

The input/output control register group 32 is a memory including plural registers (storage areas). The plural registers in the input/output control register group 32 include an input register and an output register. Data indicating the state of each apparatus is written to the input register. Data for controlling each apparatus which is transmitted from the CPU 20 of the main control unit 12 is written to the output register. In addition, the input/output control register group 32 includes a register (hereinafter, referred to as an interrupt register) to which data indicating the occurrence of an interrupt is written and a register (hereinafter, referred to as an interrupt factor register) to which data indicating an interrupt factor is written.

As described above, the content of data stored in each register of the input/output control register group 32 is copied to the copy register group 24 of the main control unit 12. In this exemplary embodiment, the CPU 20 may read data copied to the copy register group 24 and refer to the same data as that written to the input/output control register group 32. In addition, in this exemplary embodiment, the CPU 20 may read data written to the input/output control register group 32 through the serial bus 40 and acquire the data. In this exemplary embodiment, the memory size of the copy register group 24 is equal to that of the input/output control register group 32. When data is copied from the input/output control register group 32 to the copy register group 24, data read from the input/output control register group 32 is written to the register of the copy register group 24 corresponding to the register storing the data in the input/output control register group 32.

The driving and receiving circuit 34 is connected to each apparatus of the apparatus group 16 forming the image forming apparatus 10. When data for controlling the apparatus is written to the output register of the input/output control register group 32, the driving and receiving circuit 34 outputs a driving signal corresponding to the data to the apparatus corresponding to the output register. The apparatus is driven according to the output driving signal. When a signal indicating the state of the apparatus is input from the connected apparatus, data corresponding to the signal is written to the input register for the data indicating the state of the apparatus. For example, when the apparatus is a sensor, the data indicating the state may be data indicating the detection result of the sensor. When the apparatus is a motor, the data indicating the state may be data indicating the rotational state of the motor.

The CPU 20 which controls the overall operation of the image forming apparatus 10 checks the state of the apparatus from data written to the input register and writes control data to the output register to control the driving of each apparatus.

However, in this exemplary embodiment, data in the input/output control register group 32 is copied to the copy register group 24 in a cycle equal to or less than the cycle of a system timer, which will be described below. When, for example, the state of the apparatus is checked, the CPU 20 may check, for example, the state of the apparatus only by reading the data copied to the copy register group 24 provided in the main control unit 12, without acquiring data from the input/output control register group 32 through the serial bus 40.

Figure 2:
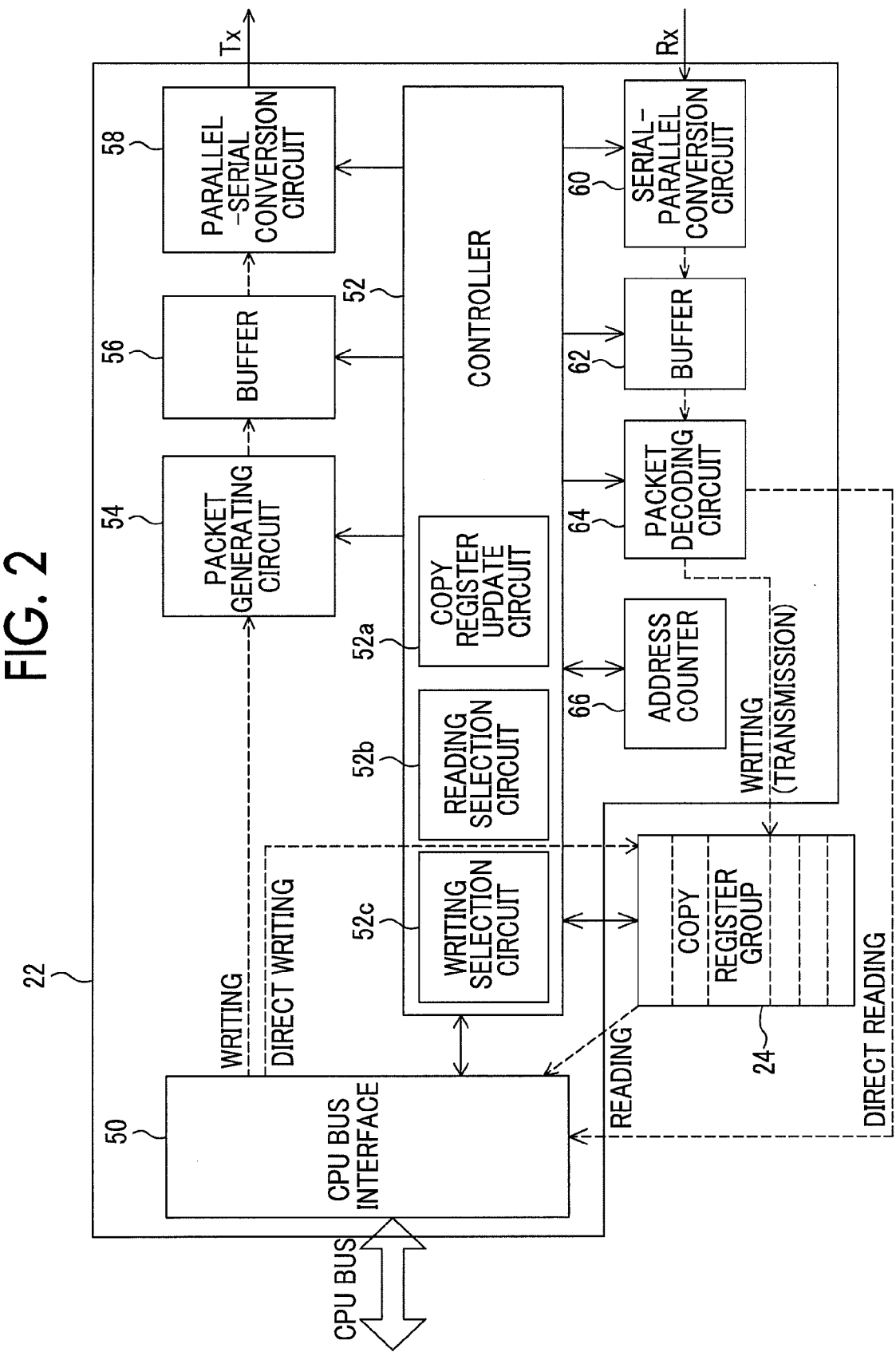
FIG. 2 is a diagram illustrating an example of the structure of a SerDes control unit of a main control unit according to the first exemplary embodiment.

FIG. 2 is a diagram illustrating an example of the structure of the SerDes control unit 22 in the main control unit 12. The SerDes control unit 22 includes a CPU bus interface 50, a controller 52, a packet generation circuit 54, a buffer 56, a parallel-serial conversion circuit 58, a serial-parallel conversion circuit 60, a buffer 62, a packet decoding circuit 64, and an address counter 66.

The CPU bus interface 50 is for communication with the CPU 20 through the CPU bus 26. The controller 52 is connected to each component of the SerDes control unit 22 and controls, for example, a protocol or the operation time of each component to control the overall operation of the SerDes control unit 22.

The packet generation circuit 54 generates packets. The buffer 56 temporarily stores the packets generated by the packet generation circuit 54. The parallel-serial conversion circuit (serializer) 58 converts the serial packet which is temporarily stored in the buffer 56 into a parallel packet and transmits the parallel packet to the apparatus control unit 14 through the serial bus 40.

The serial-parallel conversion circuit (deserializer) 60 converts the serial packet which is received from the apparatus control unit 14' through the serial bus 40 into the parallel packet. The buffer 62 temporarily stores the parallel packet converted by the serial-parallel conversion circuit 60. The packet decoding circuit 64 decodes the parallel packet which is temporarily stored in the buffer 62 and extracts data included in the packet.

The address counter 66 generates a write destination address when data which has been read from the input/output control register group 32 and then transmitted is written to the copy register group 24 and outputs the write destination address to the controller 52. The copy of data to the copy register group 24 is performed by sequentially writing data with a predetermined size, which has been read from the input/output control register group 32 and then transmitted, from the initial address of the copy register group 24. Therefore, whenever data with a predetermined size is written, an address which is increased by a value corresponding to the size is output. After the writing of all data to the copy register group 24 ends, the address counter 66 is reset before the next writing operation starts (the address counter 66 is set to the count value of the initial address).

A copy register update circuit 52a, a reading selection circuit 52b, and a writing selection circuit 52c are provided as the functions of the controller 52 in the controller 52.

The copy register update circuit 52a writes the data, which has been read from each register of the input/output control register group 32 and then transmitted, to the copy register group 24 to update the content of the copy register group 24.

When receiving a request to read data written to the input/output control register group 32 from the CPU 20, the reading selection circuit 52b selects whether to read data copied to the copy register group 24 or to directly read data written to the input/output control register group 32 on the basis of the read request, performs a reading process, and supplies the read data to the CPU 20.

When receiving a request to write data to the input/output control register group 32 from the CPU 20, the writing selection circuit 52c selects whether to write data only to the input/output control register group 32 or to directly write data to both the input/output control register group 32 and the copy register group 24 (not update by copying) on the basis of the write request and performs a writing process.

Figure 3:
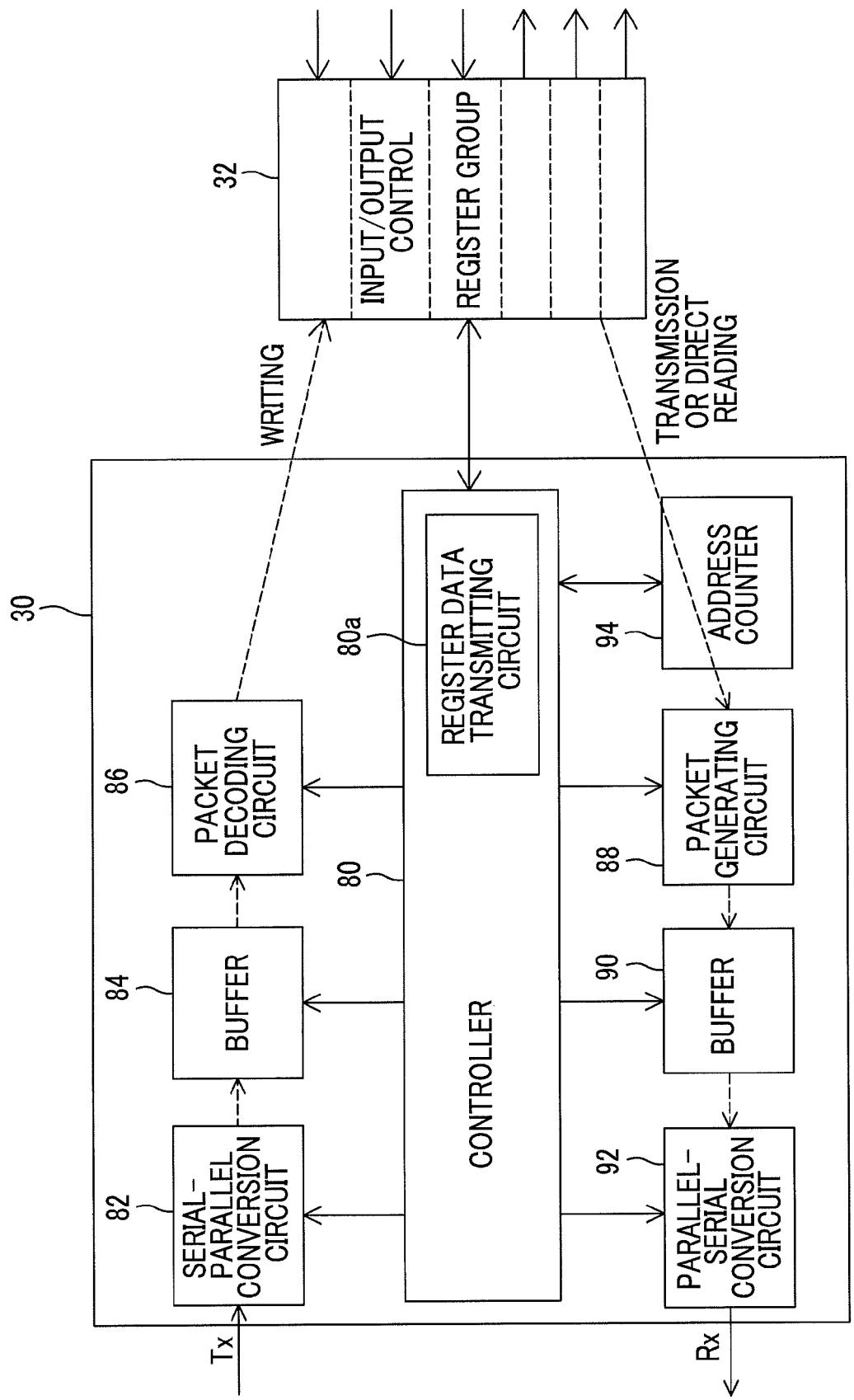
FIG. 3 is a diagram illustrating an example of the structure of a SerDes control unit of an apparatus control unit according to the first and second exemplary embodiments.

FIG. 3 is a diagram illustrating an example of the structure of the SerDes control unit 30 in the apparatus control unit 14. The SerDes control unit 30 includes a controller 80, a serial-parallel conversion circuit (deserializer) 82, a buffer 84, a packet decoding circuit 86, a packet generation circuit 88, a buffer 90, a parallel-serial conversion circuit (serializer) 92, and an address counter 94.

The controller 80 is connected to other components of the SerDes control unit 30 and controls, for example, a protocol or the operation time of the components, thereby controlling the overall operation of the SerDes control unit 30.

The serial-parallel conversion circuit 82 converts the serial packet which is received from the main control unit 12 through the serial bus 40 into a parallel packet. The buffer 84 temporarily stores the parallel packet converted by the serial-parallel conversion circuit 82. The packet decoding circuit 86 decodes the parallel packet which is temporarily stored in the buffer 84 and extracts data included in the packet.

The packet generation circuit 88 generates packets. The buffer 90 temporarily stores the packets generated by the packet generation circuit 88. The parallel-serial conversion circuit 92 converts the serial packet which is temporarily stored in the buffer 90 into a parallel packet and transmits the parallel packet to the main control unit 12 through the serial bus 40.

The address counter 94 generates a data read destination address when data is read from the input/output control register group 32 and is then copied to the copy register group and outputs the data read destination address to the controller 80. The copy of data to the copy register group 24 is performed by reading data with a predetermined size from the input/output control register group 32 and sequentially transmitting the data to the main control unit 12. Therefore, whenever data with a predetermined size is read from the input/output control register group 32, an address which is increased by a value corresponding to the size is output. The address counter 94 is reset when the reading of data from the input/output control register group 32 for copy to the copy register group 24 ends or when the reading of data starts.

A register data transmitting circuit 80a is provided as one of the functions of the controller 80 in the controller 80. In order to copy the data written to each register of the input/output control register group 32 to the copy register group 24, the register data transmitting circuit 80a reads data from the input/output control register group 32, outputs the data to the packet generation circuit 88, and directs the packet generation circuit 88 to generate a packet (hereinafter, referred to as a copy packet) to be written to the copy register group 24. The copy packet is converted into a serial packet by the parallel-serial conversion circuit 92 and is transmitted to the main control unit 12 through the serial bus 40.

When data indicating the occurrence of an interrupt is written to the interrupt register of the input/output control register group 32, the controller 80 directs the packet generation circuit 88 to generate an interrupt packet for notifying the occurrence of the interrupt. The generated interrupt packet is converted into a serial packet by the parallel-serial conversion circuit 92 and is then transmitted to the main control unit 12. The controller 52 of the main control unit 12 includes an interrupt signal generation circuit (not shown). When receiving the interrupt packet, the interrupt signal generation circuit generates an interrupt signal. When receiving the interrupt signal, the CPU 20 determines that an interrupt occurs, reads data indicating the interrupt factor from the copy register group 24, and performs a process corresponding to the interrupt factor.

The CPU 20 of the main control unit 12 operates on the basis of the system timer. The system timer counts time at a predetermined time interval (cycle) and generates a timer interrupt for the CPU 20 for every count. The update of the system timer (the count of the timer) is performed on the basis of a clock which is supplied from a timer integrated circuit (IC) (not shown) provided on the substrate of the main control unit 12. The system timer is a generally known technique in a real-time operating system (OS). Therefore, in this embodiment, the description thereof will not be repeated.

A timer IC (not shown) is also provided in the apparatus control unit 14 and outputs a clock in the same cycle as the count cycle of the system timer.

Each of the SerDes control unit 22, the copy register group 24, the SerDes control unit 30, the input/output control register group 32, and the driving and receiving circuit 34 is formed by hardware, such as an application specific integrated circuit (ASIC) or a field programmable gate array (FPGA).

Next, the operation of the control device 11 according to this exemplary embodiment will be described.

Update of Input/Output Control Register Group 32

The CPU 20 outputs a request to write control data for controlling the apparatus to the SerDes control unit 22 through the CPU bus 26. The write request designates data to be written and the address of the register, which is a write destination, in the input/output control register group 32. When receiving the write request through the CPU bus interface 50, the controller 52 of the SerDes control unit 22 controls the packet generation circuit 54, the buffer 56, and the parallel-serial conversion circuit 58 such that the write request received from the CPU 20 is packetized and transmitted.

The controller 80 of the apparatus control unit 14 controls the serial-parallel conversion circuit 82, the buffer 84, and the packet decoding circuit 86 such that the packet of the write request is decoded and the write request is extracted.

The controller 80 writes control data for controlling an apparatus corresponding to a register (output register) with the address which is designated by the decoded write request among plural registers in the input/output control register group 32 to the register. In this way, the apparatus is driven according to the written control data.

When a signal indicating the state of the connected apparatus is input from the apparatus, the driving and receiving circuit 34 writes data corresponding to the signal to the input register for the data indicating the state of the apparatus.

In this exemplary embodiment, the apparatus control unit 14 is provided with an interrupt circuit (not shown). When the interrupt circuit detects an interrupt (for example, an error in the operation of the apparatus), the controller 80 provided in the SerDes control unit 30 of the apparatus control unit 14 writes data indicating the occurrence of the interrupt to the interrupt register of the input/output control register group 32 and writes data for the interrupt factor to the interrupt factor register. In addition, the controller 80 directs the packet generation circuit 88 to generate an interrupt packet, directs the parallel-serial conversion circuit 92 to convert the interrupt packet into a serial packet, and transmits the serial packet to the main control unit 12. Copy to Copy Register Group 24

The control device 11 according to this exemplary embodiment performs a copy process of reading all data stored in the input/output control register group 32 in a cycle equal to or less than the count cycle of the system timer, transmitting the read data through the serial bus 40, and writing the read data to the copy register group 24. For example, when the count cycle of the system timer is 1 ms, the copy cycle is equal to or less than 1 ms. In this exemplary embodiment, data stored in the input/output control register group 32 is sequentially read from the initial address, plural packets are generated from the read data without designating the address of a copy destination and are then transmitted, and data is written in the transmission order of the plural packets from the initial address of the copy register group 24.

Next, the copy process will be described in detail.

When a clock is output from the timer IC provided in the apparatus control unit 14, the controller 80 in the SerDes control unit 30 of the apparatus control unit 14 starts a reading process for copying data from the input/output control register group 32 to the copy register group 24. In this exemplary embodiment, the time when the clock of the timer IC is output is a read start time. However, this is an illustrative example and the read start time is not limited thereto.

Specifically, the register data transmitting circuit 80*a* of the controller 80 sequentially reads data with a predetermined size (for example, several words) from the initial address of the input/output control register group 32 according to the address output from the address counter 94 and sequentially inputs the read data to the packet generation circuit 88. The initial value of the address counter 94 is the initial address of the input/output control register group 32. Whenever the register data transmitting circuit 80*a* reads data, the address counter 94 increases the count by a value corresponding to the read size. The register data transmitting circuit 80*a* repeats a process of reading data corresponding to the read size from the address indicated by the count value of the address counter 94 and inputting the read data to the packet generation circuit 88 until all data is read from the input/output control register group 32.

Whenever data to be copied is input, the packet generation circuit 88 generates a copy command packet (hereinafter, referred to as a copy packet) for writing the data to the copy register group 24 and stores the copy packet in the buffer 90. The copy packet does not include information about the address of a copy destination (write destination). In this way, the amount of data transmitted is reduced.

The parallel-serial conversion circuit 92 converts the copy packet stored in the buffer 90 into a serial signal and outputs the serial signal to the signal line Rx of the serial bus 40 under the control of the register data transmitting circuit 80*a*. In this way, plural copy packets are generated from all data stored in the input/output control register group 32 and are then transmitted to the main control unit 12.

The copy packet transmitted to the main control unit 12 is converted into a parallel copy packet by the serial-parallel conversion circuit 60 and the parallel copy packet is stored in the buffer 62. The packet decoding circuit 64 decodes the copy packet stored in the buffer 62 and extracts data to be copied.

The copy register update circuit 52*a* writes the data decoded by the packet decoding circuit 64 to the register which is indicated by the address output from the address counter 66 in the copy register group 24. The size of data written by one copy packet is equal to the read size when data is read from the input/output control register group 32. The initial value of the address counter 66 is the initial address of the copy register group 24. Whenever the copy register update circuit 52*a* writes data for the copy packet, the address counter 66 increases the count by a value corresponding to the read size. The copy register update circuit 52*a* repeatedly performs a process of writing data to the address indicated by the count value of the address counter 66 until all data which has been read and transmitted from the input/output control register group 32 is written.

As such, the process of sequentially reading data with the same size from the initial address of the input/output control register group 32 and sequentially writing the data to the copy register group 24 is repeatedly performed. Finally, all data is copied to the copy register group 24. Therefore, even when the address of the copy destination (write destination) is not designated by the copy packet, the copy process is performed without any problem. In this way, the copy process is simplified.

In this exemplary embodiment, as described above, the register data transmitting circuit 80*a* and the copy register update circuit 52*a* are configured such that all data is copied to the copy register group 24 in a cycle equal to or less than the count cycle of the system timer. That is, the time from the start to the end of the copy of all data is a cycle equal to or less than the count cycle of the system timer. The start of copy means the time when data to be copied starts to be read from the input/output control register group 32 and the end of copy means the time when the writing of all data to the copy register group 24 ends. Therefore, when data in the input/output control register group 32 is updated during a given count cycle, the updated data is copied to the copy register group 24 in the next count cycle at the latest. The CPU 20 refers to the data copied to the copy register group 24 to refer to data which is updated in a cycle equal to or less than the count cycle of the system timer. The copy cycle is set in advance.

The plural copy packets generated from the data in the input/output control register group 32 are transmitted one by one at an interval equal to or more than a predetermined time (however, such that the time from the start to the end of copy is equal to or less than the count cycle of the system timer). Therefore, even when an interrupt occurs in the copy packet transmission process, it is possible to transmit the interrupt packet to the main control unit 12 for the period from the transmission of the copy packet to the transmission of the next copy packet. When the interrupt packet is not transmitted, the copy packet may be transmitted at a short interval (that is, the transmission interval is shorter than that when the interrupt packet is issued).

Reading of Data by CPU 20

When referring to data written to the input/output control register group 32, the CPU 20 does not directly acquire data from the input/output control register group 32, but reads data from the copy register group 24. Therefore, it is possible to refer to the data written to the input/output control register group 32.

Therefore, when data is read, the CPU 20 outputs a read request to designate the address of the copy register group 24 to the SerDes control unit 22. When acquiring a request to read data in the copy register group 24 from the CPU 20 through the CPU bus interface 50, the reading selection circuit 52b in the controller 52 of the SerDes control unit 22 reads data (data with the address designated by the read request) copied to the copy register group 24 and supplies the data to the CPU 20. A read request packet to the input/output control register group 32 is not issued.

Comparison with Control Device According to Related Art

Next, the control device 11 according to this exemplary embodiment will be described while being compared with an example of the structure of the control device according to the related art shown in FIGS. 17A and 17B.

As shown in FIG. 17A, in the control device according to the related art, an input/output control register group is provided in a main control unit. The input/output control register group of the main control unit is connected to a driving and receiving circuit of an apparatus control unit by parallel signal lines. Data for controlling the driving of, for example, a motor or a switch, is output from the input/output control register group to the driving and receiving circuit through the parallel signal lines, and data indicating the state of the apparatus, such as the detection result of a sensor, is input from the driving and receiving circuit to the input/output control register group through the parallel signal lines. That is, it is necessary to connect the main control unit and the apparatus control unit with the parallel signal lines which are proportional to the number of apparatuses. However, it is difficult to arrange many parallel signal lines due to problems, such as the mounting space of a substrate of the main control unit.

Figure 17B:
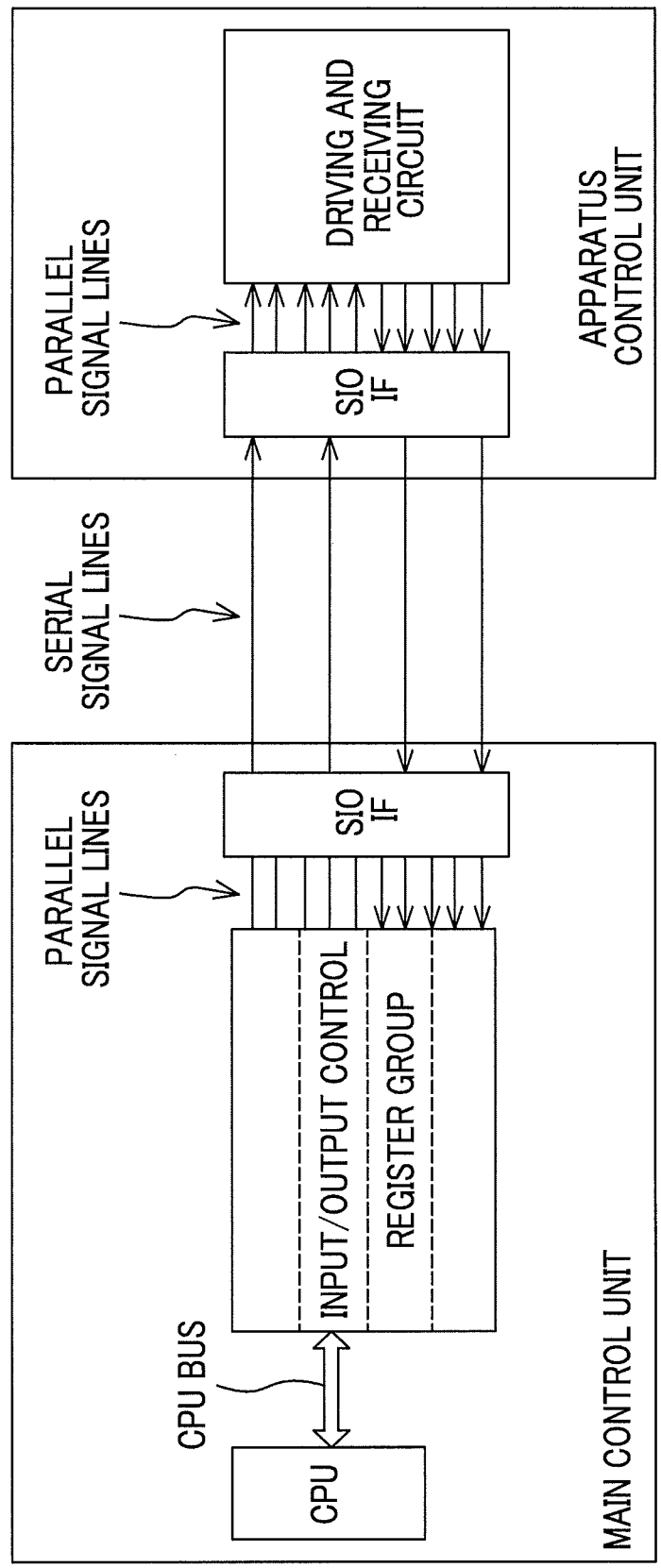

As shown in FIG. 17B, the following structure is considered: a serial I/O interface (SIO IF) is provided in each of a main control unit and an apparatus control unit; the main control unit and the apparatus control unit are connected to each other by plural serial signal lines; plural parallel signal lines are divided into some groups; the serial signal lines are arranged such that one serial signal line corresponds to one group; plural parallel signals in the same group are converted into a serial signal; and the serial signal is transmitted and received through the corresponding serial signal line. According to this structure, it is possible to reduce the number of signal lines connecting the main control unit and the apparatus control unit. However, when the apparatuses are changed due to, for example, an increase in the number of apparatuses connected to the driving and receiving circuit, the number of serial signal lines increases. As such, when the number of apparatuses increases, it is necessary to newly set the grouping. In this case, it is necessary to newly manufacture both the apparatus control unit and the main control unit.

In contrast, in the control device 11 according to this exemplary embodiment, the main control unit 12 and the apparatus control unit 14 are connected to each other by the general-purpose serial bus 40 and the input/output control register group 32 is provided in the apparatus control unit 14. Therefore, it is possible to reduce the number of signal lines for connecting the main control unit 12 and the apparatus control unit 14 and reduce the area of the substrate of the main control unit 12 or the apparatus control unit 14, which results in a reduction in costs. In addition, even when the functions are changed (for example, the number of apparatuses in the apparatus group 16 increases or decreases), there is no change in the number of signal lines for connecting the main control unit 12 and the apparatus control unit 14. Since the structure of the main control unit 12 does not depend on the increasing number of apparatuses, it is not necessary to newly manufacture the main control unit 12.

In this exemplary embodiment, since the serial bus 40 is used, the deterioration (for example, skew or variation) of signal quality does not occur during remote connection, unlike the parallel bus.

Since the serial bus 40 is a general-purpose serial transmission path with a transmission rate of, for example, several hundreds of Mbps, the SerDes control unit 22 or the SerDes control unit 30, which is an interface of the transmission path, is implemented by an inexpensive device (ASIC or FPGA). In addition, since communication is performed through packets, it is easy to check errors and the reliability of the transmission path is improved.

In a structure in which the input/output control register group 32 is provided in the apparatus control unit 14 and data is constantly read from the input/output control register group 32, a delay occurs when data is read. That is, it takes a long time from the transmission of the read request to the input/output control register group 32 through the serial bus 40 to the transmission of read data to the CPU 20. However, in this exemplary embodiment, since the copy register group 24 is provided in the main control unit 12 and data in the input/output control register group 32 is copied to the copy register group 24, the CPU 20 may read the data copied to the copy register group 24, without using the serial bus 40, thereby acquiring the data stored in the input/output control register group 32.

Therefore, a delay does not occur when data is read and the same reading performance as that in the related art is ensured, without using a transmission path with a higher transmission rate than necessary. In addition, for writing, when a write request is output from the CPU 20 to the SerDes control unit 22, the SerDes control unit 22 generates packets and the apparatus control unit 14 performs a writing process. Therefore, the CPU 20 does not wait for the writing process.

Direct Reading Process

In the above-mentioned example, the CPU 20 reads the copied data from the copy register group 24, but the invention is not limited thereto. When the CPU 20 outputs a request to directly read data from the input/output control register group 32, the function of the reading selection circuit 52b makes it possible to read data from the input/output control register group 32 and transmit the data to the CPU 20.

When receiving a normal read request to read data from the copy register group 24, the reading selection circuit 52b reads data from the register with the designated address in the copy register group 24 and supplies the read data to the CPU 20, as described in the exemplary embodiment. On the other hand, when receiving a read request to directly read data from the input/output control register group 32, the reading selection circuit 52b does not read data from the copy register group 24, but performs a reading process (direct reading process) of reading data from the input/output control register group 32.

Specifically, the reading selection circuit 52b packetizes the read request designating the address of the input/output control register group 32 using the packet generation circuit 54, stores the read request packet in the buffer 56, converts the read request packet stored in the buffer 56 into a serial signal packet using the parallel-serial conversion circuit 58, and outputs the serial signal packet to the signal line Tx of the serial bus 40.

In the SerDes control unit 30 of the apparatus control unit 14, when the read request packet is received, the serial-parallel conversion circuit 82 converts the received packet into a parallel packet. The parallel packet is stored in the buffer 84 and the packet decoding circuit 86 decodes the read request packet stored in the buffer 84 to extract data in the read request. The controller 80 reads data from the register with the address designated by the read request in the input/output control register group 32 on the basis of the read request. The packet generation circuit 88 packetizes the read data and the read data packet is stored in the buffer 90. The parallel-serial conversion circuit 92 converts the packet stored in the buffer 90 into a serial signal and outputs the serial signal to the signal line Rx.

When receiving the read data packet transmitted from the apparatus control unit 14, the reading selection circuit 52b of the main control unit 12 converts the data packet into a parallel packet using the serial-parallel conversion circuit 60, decodes the data packet using the packet decoding circuit 64 to extract data, transmits the data to the CPU bus 26 through the CPU bus interface 50, and supplies the data to the CPU 20.

When the direct reading process is available in this way, the CPU 20 is capable of responding to a case in which it wants to directly refer to the data in the input/output control register group 32.

Direct Writing Process

In the above-mentioned example, when a write request is output from the CPU 20, data is written only to the input/output control register group 32. However, the invention is not limited thereto. For example, when the CPU 20 outputs a write request to directly write data to the copy register group 24 in addition to the input/output control register group 32, the function of the writing selection circuit 52c makes it possible to perform a process (direct writing process) of writing data to the designated address of the copy register group 24.

Specifically, similarly to the above-mentioned example, the writing selection circuit 52c generates a write request packet, converts the write request packet into a serial write request packet, transmits the write request packet to the apparatus control unit 14 through the serial bus 40, and writes the designated data to the register with the address designated by the write request among the registers in the input/output control register group 32.

The writing selection circuit 52c writes data designated by the write request which is received from the CPU 20 to the register of the copy register group 24 corresponding to the register of the input/output control register group 32 to which data has been written.

As such, the writing selection circuit 52c selects the content of a process according to whether the write request received from the CPU 20 is a write request to write data only to the input/output control register group 32 or a write request to write data to both the input/output control register group 32 and the copy register group 24 and performs the process.

When the direct writing process is performed, the writing of data to the register of the copy register group 24 to which data has been directly written is masked (prohibited) in a copy process which is performed in a copy cycle immediately after the direct writing process is performed.

Others

In this exemplary embodiment, one apparatus control unit 14 is provided. However, plural apparatus control units 14 may be provided. Each of the plural apparatus control units 14 may be connected to the main control unit 12 through the serial bus 40 and data may be copied from the input/output control register group 32 to the copy register group 24 in a cycle equal to or less than the count cycle of the system timer, as described above.

Although not described above, in the transmission and reception of packets, when a packet is normally received, a response packet (ACK) indicating that the packet has been normally received is transmitted to a partner apparatus. When a reception error occurs, a response packet (NACK) indicating the reception error is transmitted to the partner apparatus. In this way, a notice indicating whether a process has been completed or an error has occurred is transmitted to the partner apparatus. When the response packet NACK is received, the packet is retransmitted.

For example, when the copy packet is received from the apparatus control unit 14, the controller 52 performs an error check, such as a CRC check. When it is detected that the packet is normally received, the controller 52 returns the response packet ACK and sequentially writes data from the initial address of the copy register group 24. When an error is detected in the error check of the received copy packet, the controller 52 returns the response packet NACK.

For example, when a request packet to write data to the input/output control register group 32 is transmitted from the main control unit 12 to the apparatus control unit 14, similarly, the controller 80 performs the CRC check. When it is detected that the packet is normally received, the controller 80 writes data to the designated address and transmits the response packet ACK.

When a request packet to read data from the input/output control register group 32 is transmitted from the main control unit 12 to the apparatus control unit 14, similarly, the controller 80 performs the CRC check. When it is detected that the packet is normally received, the controller 80 reads data from the designated address, packetizes the read data, and transmits the read data packet. When an error is detected, the controller 80 returns the response packet NACK. In these processes, the CRC check is not performed, but only a parity check is performed for the response packets ACK/NACK.

Since the above-mentioned communication control is a generally used technique, the detailed description thereof will not be repeated.

In this exemplary embodiment, plural copy packets are transmitted and the response packet ACK returns in each predetermined copy cycle. Therefore, the periodical communication makes it possible to check a link disconnection error in the serial bus 40. For example, when a packet is not transmitted and received within a predetermined time, it may be determined that a link disconnection error has occurred in the serial bus 40.

In this exemplary embodiment, the copy register update circuit 52a, the reading selection circuit 52b, and the writing selection circuit 52c are described as the functions of the controller 52, but the invention is not limited thereto. For example, the copy register update circuit 52a, the reading selection circuit 52b, and the writing selection circuit 52c may be formed separately from the controller 52 and the controller 52 may control each circuit to implement each function.

In this exemplary embodiment, plural copy packets whose write destination addresses are not designated are transmitted from the apparatus control unit 14 to the main control unit 12 and data is written to the copy register group 24. However, a copy packet with the designated address may be generated and transmitted. In this case, data is written to the designated address.

Second Exemplary Embodiment

As described above in the first exemplary embodiment, when an interrupt occurs in the apparatus control unit 14, the interrupt packet is generated and transmitted to the main control unit 12. The interrupt packet is decoded by the SerDes control unit 22 and is transmitted as an interrupt signal to the CPU 20. When receiving the interrupt signal, the CPU 20 reads data for the interrupt factor from the copy register group 24 and performs a process corresponding to the read data for the interrupt factor. However, in the copy register group 24, the addresses are not individually designated, but data is sequentially updated (copied) from a first data item (that is, the address is not managed) in a cycle equal to or less than the count cycle of the system timer. Therefore, when the interrupt signal is received while data is being copied to the copy register group 24, in order to reliably acquire the newly updated interrupt factor, data for the interrupt factor needs to be read after copy is completed in the next cycle. That is, until copy is completed in the next cycle after the interrupt signal is received, the CPU 20 is in an idle state (waiting operation). When the idle state of the CPU 20 is long, the overall performance of the apparatus is reduced.

In a second exemplary embodiment, the SerDes control unit 22 includes an interrupt signal delay circuit 68 that delays the interrupt signal and outputs the delayed interrupt signal to the CPU 20.

Figure 4:
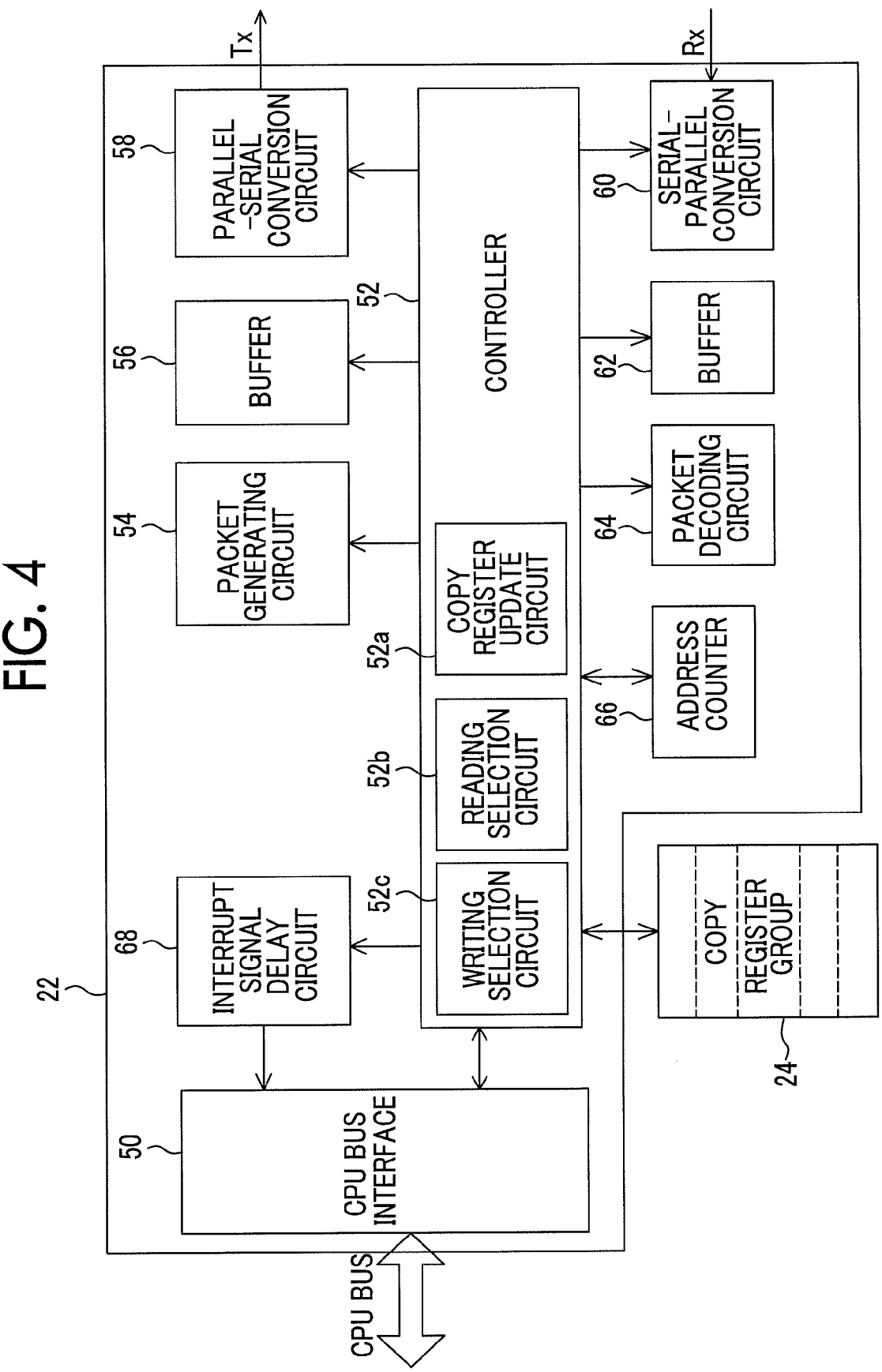
FIG. 4 is a diagram illustrating an example of the structure of a SerDes control unit of a main control unit according to the second exemplary embodiment.

FIG. 4 is a diagram illustrating the structure of the SerDes control unit 22 in a main control unit 12 according to the second exemplary embodiment. The SerDes control unit 22 according to the second exemplary embodiment includes the interrupt signal delay circuit 68, instead of the interrupt signal generation circuit (not shown) described in the first exemplary embodiment. The interrupt signal delay circuit 68 is operated under the control of a controller 52. The structure of the second exemplary embodiment is similar to that of the first exemplary embodiment except for the interrupt signal delay circuit 68 and the description thereof will not be repeated. In addition, the apparatus control unit 14 has the same structure as that in the first exemplary embodiment and thus the description thereof will not be repeated.

In the second exemplary embodiment, a storage area that stores an interrupt flag is provided in the controller 52. When an interrupt packet is received from the apparatus control unit 14, the controller 52 sets the interrupt flag to 1. The interrupt flag is set to 0 bp the controller 52 when the interrupt process of the CPU 20 ends or when data for an interrupt factor is read from the copy register group 24.

In the second exemplary embodiment, a storage area that stores a start flag and a storage area that stores an end flag are also provided in the controller 52. After the interrupt packet is received, the controller 52 receives the copy packet of a first data item. When the writing of data to the copy register group 24 starts, the controller 52 sets the start flag to 1. When the writing of all data to the copy register group 24 is completed after the start flag is set to 1, the controller 52 sets the end flag to 1. For example, the controller 52 may check the start and end of writing, with reference to an address counter 66. In addition, after a predetermined period of time has elapsed from the setting of the end flag to 1, the controller 52 sets the start flag and the end flag to 0 until the next copy cycle arrives.

Figure 5:
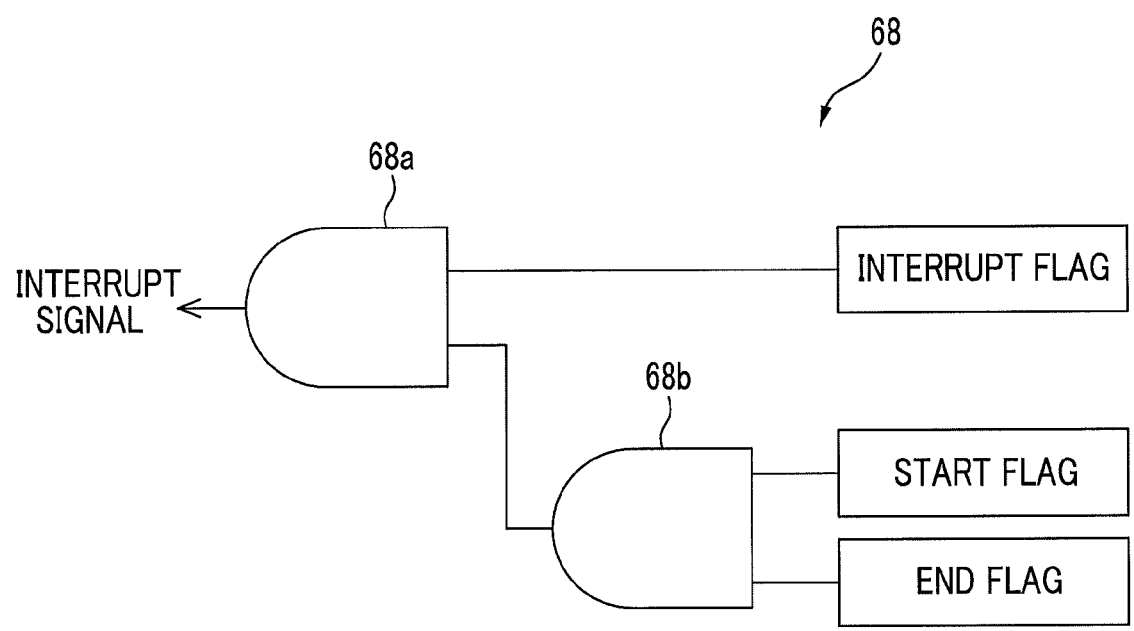
FIG. 5 is a diagram illustrating an interrupt signal delay circuit.

FIG. 5 is a diagram illustrating the structure of the interrupt signal delay circuit 68. The interrupt signal delay circuit 68 includes two AND circuits 68a and 68b. The value of the interrupt flag is input to one of two input terminals of the AND circuit 68a. The other input terminal of the AND circuit 68a is connected to an output terminal of the AND circuit 68b. The value of the start flag is input to one input terminal of the AND circuit 68b and the value of the end flag is input to the other input terminal.

When the value of the start flag and the value of the end flag are set to 1, the output of the AND circuit 68b is 1. When at least one of the two input terminals is 0, the output is 0. When the value of the interrupt flag is set to 1 and the output of the AND circuit 68b is 1, the interrupt signal is output from the output terminal of the AND circuit 68a. That is, the interrupt signal is not output to the CPU 20 only by the reception of the interrupt packet. After the interrupt flag is set to 1, the start flag is set to 1 and then the end flag is set to 1. Then, the interrupt signal is output.

When an interrupt signal is generated from the AND circuit 68a, the interrupt signal is output to a CPU bus 26 through a CPU bus interface 50 and is then transmitted to the CPU 20.

Next, the flow of the interrupt process according to the second exemplary embodiment will be described with reference to FIGS. 6 and 7.

Figure 6:
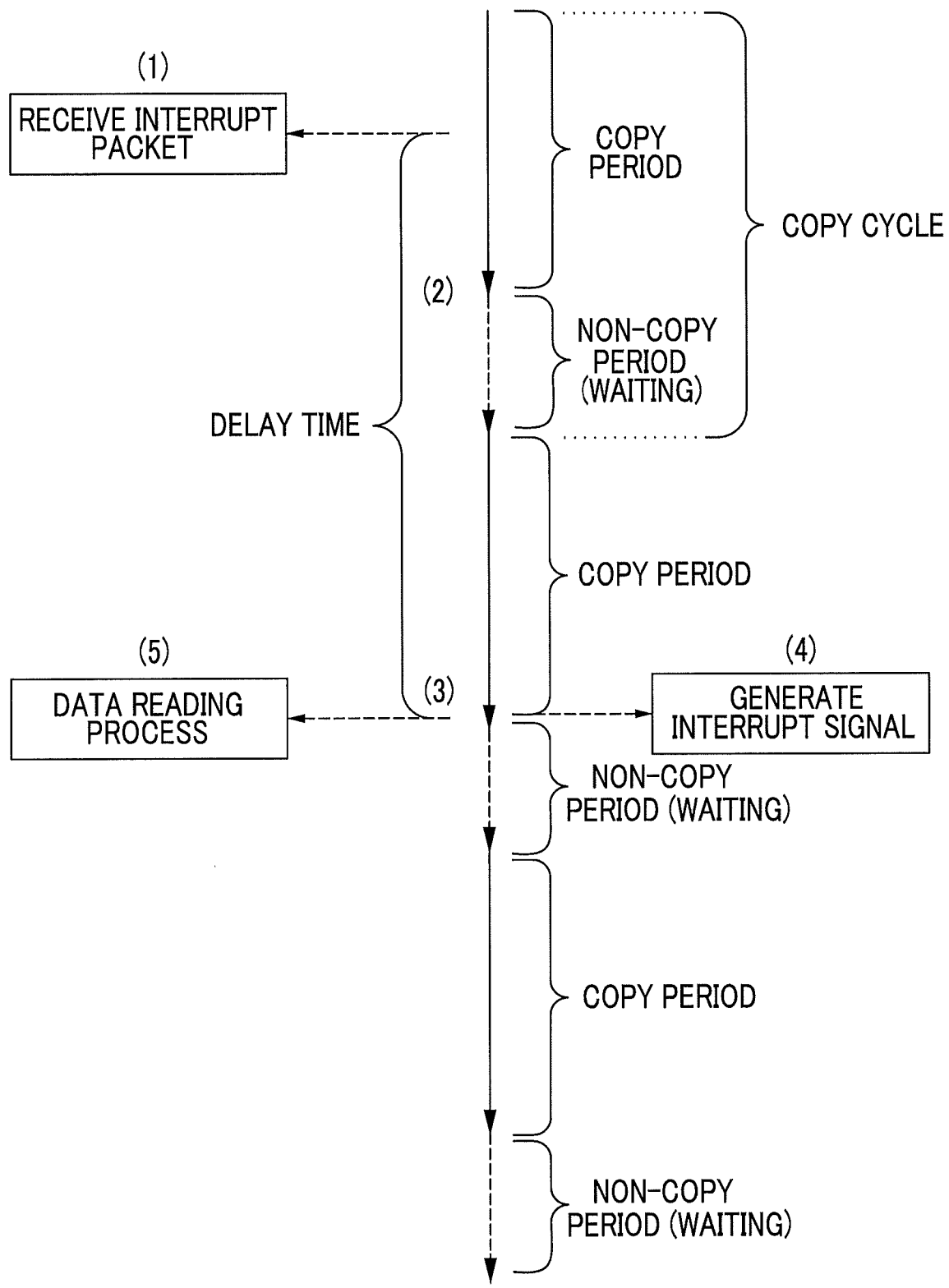
FIG. 6 is a diagram illustrating the generation time of an interrupt signal.

FIG. 6 is a diagram illustrating the generation time of the interrupt signal. FIG. 7 is a flowchart illustrating the flow of the generation of the interrupt signal. However, FIG. 7 does not show the generation of the interrupt signal by software. As shown in FIG. 5, the interrupt signal is generated by the interrupt signal delay circuit 68 and the controller 52 (hardware).

Figure 7:
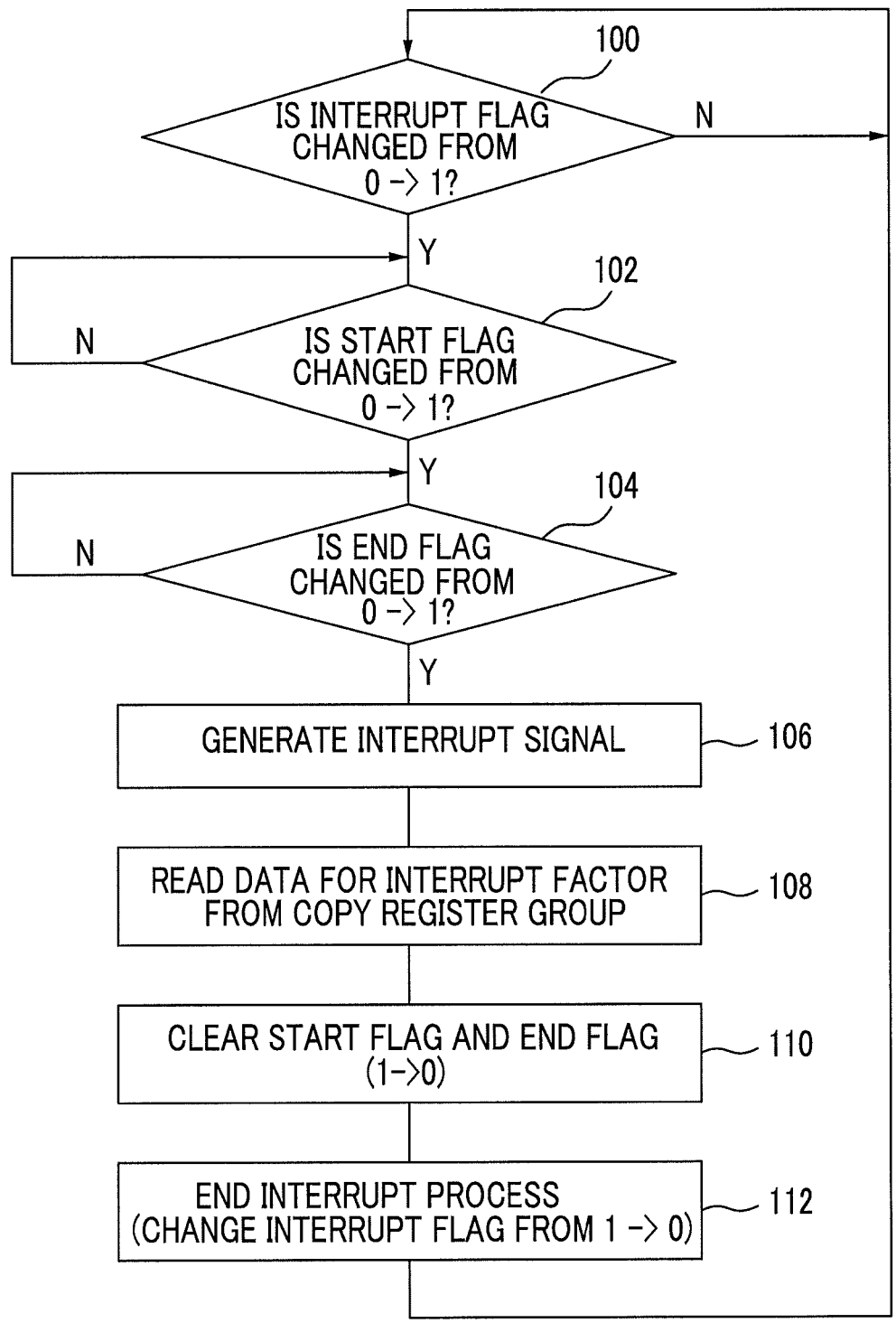
FIG. 7 is a flowchart illustrating the flow of the generation of the interrupt signal.

In Step 100 of FIG. 7, the process waits until the interrupt flag is set to 1 (see (1) of FIG. 6). When the interrupt flag is set to 1, the process waits until the start flag is set to 1 in Step 102 (see (2) of FIG. 6). When the start flag is set to 1, the process waits until the end flag is set to 1 in Step 104 (see (3) of FIG. 6).

When the end flag is set to 1 in Step 104, the interrupt signal delay circuit 68 generates an interrupt signal in Step 106 (see (4) of FIG. 6).

In Step 108, the CPU 20 receiving the interrupt signal reads data for an interrupt factor from an interrupt factor register of the copy register group 24 (see (5) of FIG. 6). Then, the CPU 20 performs a process corresponding to the read data for the interrupt factor.

That is, in the copy cycle which starts after the interrupt packet is received, the interrupt signal is generated when the copy of all data to the copy register group 24 ends. Therefore, the CPU 20 may rapidly check the updated data for the interrupt factor.

In Step 110, the controller 52 clears the start flag and the end flag (sets the start flag and the end flag to 0). In Step 112, when the interrupt process of the CPU 20 ends, the interrupt flag is set to 0. Then, the process returns to Step 100.

As described above, even in the structure in which the control device 11 copies data to the copy register group 24 without designating an address, the start and end of writing are detected after the interrupt packet is received and the interrupt signal is transmitted to the CPU 20, with the interrupt factor being newly updated. Therefore, the CPU 20 may read data for the interrupt factor from the copy register group 24 immediately after receiving the interrupt signal. Therefore, the overall performance of the apparatus is not reduced.

Third Exemplary Embodiment

As described in the first exemplary embodiment and the second exemplary embodiment, the copy packet does not include address information. Therefore, when the copy packet is not normally transmitted, data is likely to be stored in a wrong address of the copy register group 24 and a system error is likely to occur. It is necessary to perform a system reset in order to recover the system from this state.

In the first exemplary embodiment and the second exemplary embodiment, the copy register group 24 of the main control unit 12 and the input/output control register group 32 of the apparatus control unit 14 have the same memory size and transmit data in the corresponding areas. For example, when a process is performed considering that the input/output control register group 32 and the copy register group 24 have the same size although the memory size of the input/output Control register group 32 is less than that of the copy register group 24, the copy packet needs to be unnecessarily transmitted from the apparatus control unit 14 to the main control unit 12.

In a third exemplary embodiment, a unit which resets an address counter 66 and an address counter 94 at the time when predetermined conditions are satisfied is provided in a control device 11 such that data is normally and effectively copied to the copy register group 24. The term "reset" means a process of initializing the address counter 66 to have the count value of the initial address of the copy register group 24 and a process of initializing the address counter 94 to have the count value of the initial address of the input/output control register group 32.

FIG. 8 is a diagram illustrating the structure of a SerDes control unit 22 of a main control unit 12 according to the third exemplary embodiment. The SerDes control unit 22 according to the third exemplary embodiment includes a timer 70 and a control register 72 in addition to the structure of the SerDes control unit 22 according to the first exemplary embodiment. The timer 70 outputs a reset signal to the address counter 66 at a time interval which is stored (set) in the control register 72 in advance. In addition, the control register 72 stores data, such as a set value for validating or invalidating the timer 70, the time interval at which the timer 70 outputs the reset signal, or a reset flag indicating the reset of the address counter 66.

FIG. 9 is a diagram illustrating the structure of a SerDes control unit 30 of an apparatus control unit 14 according to the third exemplary embodiment. The SerDes control unit 30 according to the third exemplary embodiment includes a timer 96 and a control register 98 in addition to the SerDes control unit 30 according to the first exemplary embodiment. The timer 96 outputs a reset signal to the address counter 94 at a time interval which is stored (set) in the control register 98 in advance. In addition, the control register 98 stores data, such as a set value for validating or invalidating the timer 96, the time interval at which the timer 96 outputs the reset signal, or a reset flag indicating the reset of the address counter 94.

In this exemplary embodiment, the count value of the address counter 66 is reset at at least one of any time in the period from the time when the writing of all data from the input/output control register group 32 to the copy register group 24 ends to the time when the writing of a first data item starts in the next cycle and the time when an error occurs during the copy of data. In addition, the address counter 94 is reset at at least one of any time in the period from the time when the reading of all data from the input/output control register group 32 ends to the time when the reading of the first data item starts in the next cycle, and the time when an error occurs during the copy of data.

Next, examples of various methods of resetting the address counters 66 and 94 according to the third exemplary embodiment will be described with reference to FIGS. 10 to 15. FIGS. 10 to 15 shows the reset time of the address counter 66 in the main control unit 12 when the copy cycle is 1 ms.

(1) Method of Resetting Address Counter Using Setting of Control Register

A CPU 20 sets the control register 72. When an error occurs during copy, the CPU 20 outputs a reset command to set the reset flag of the control register 72 to 1 to the SerDes control unit 22 through a CPU bus 26. A controller 52 of the SerDes control unit 22 sets the reset flag of the control register 72 to 1 in response to the reset command. The address counter 66 is configured so as to be reset by itself and reads the reset flag of the control register 72 at a predetermined time (for example, when the count of the address increases or the count of the system timer increases). When the set value of the read reset flag is 1, the address counter 66 is reset by itself. After the reset is completed, the reset flag of the control register 72 is reset to 0 by the controller 52.

The controller 52 generates a reset packet for resetting the address counter 94 of the apparatus control unit 14 using a packet generation circuit 54, a buffer 56, and a parallel-serial conversion circuit 58 in response to the reset command from the CPU 20 and transmits the reset packet to the apparatus control unit 14. When receiving the reset packet, the controller 80 of the SerDes control unit 30 of the apparatus control unit 14 outputs a reset signal to reset the address counter 94 in response to the reset packet.

The reset operation may be periodically performed in addition to when an error occurs. For example, in the case in which the input/output control register group 32 and the copy register group 24 have the same memory size, the address counter 66 may be reset when the number of times data is written to the copy register group 24 is equal to the number of times data is read from the input/output control register group 32.

Specifically, for example, the general number of times data is read from the input/output control register group 32 is stored in the control register 72. When the number of times the count value of the address counter 66 increases (the number of wiring operations) reaches the number of reading operations, the address counter 66 is reset by itself. Alternatively, the controller 52 may count the number of writing operations and transmit the reset signal to the address counter 66.

The CPU 20 outputs a set command to set the number of reading operations such that the address counter 94 of the input/output control register group 32 is reset and the SerDes control unit 22 generates a set command packet and outputs the set command packet. The controller 52 of the SerDes control unit 22 sets the value of the number of reading operations to the control register 98 in response to the set command packet. The address counter 94 is set by itself when the number of times the count of the address counter 94 increases (the number of reading operations) reaches the number of reading operations stored in the control register 98.

In each copy cycle, the controller 52 may set the reset flag of the control register 72 to 1 to reset the address counter 66 (see FIG. 10). The CPU 20 may output a reset command to set the reset flag to 1 to the SerDes control unit 22 in each copy cycle and the controller 52 may set the reset flag of the control register 72 to 1 in response to the reset command. In this case, the address counter 66 is also reset by itself according to the reset flag. For example, when data is copied in the count cycle of the system timer, the reset flag may be set to 1 at every start time of the cycle (time when the copy of data from the input/output control register group 32 to the copy register group 24 starts).

The input/output control register group 32 may be configured such that the reset signal is output from the controller 80 to the address counter 94 in each copy cycle by the timer IC of the address counter 94. In addition, the SerDes control unit 22 may generate packets in response to the reset command which is periodically output from the CPU 20 and transmit the reset packet to the apparatus control unit 14 such that the reset flag of the control register 98 is set to 1 and the address counter 94 is set by itself with reference to the reset flag. For example, when data is copied in each count cycle of the system timer, the reset flag may be set to 1 at each start time of each count cycle.

(2) Method of Resetting Address Counter Using Timer

In this method, the timer is used to reset the address counter. Specifically, the set value for validating or invalidating the timer 70 which is stored in the control register 72 is set to "valid" and the time interval at which the timer 70 outputs the reset signal is set to be equal to the copy cycle. The timer 70 operates according to the set value which is set to the control register 72 and outputs the reset signal to the address counter 66 at the set time interval (for example, at each copy start time). When receiving the reset signal, the address counter 66 is reset. FIGS. 11A and 11B show examples of the timing charts when method (2) is used. FIG. 11A shows an example of the timing chart when the input/output control register group 32 and the copy register group 24 have the same size and FIG. 11B shows an example of the timing chart when the size of the input/output control register group 32 is less than that of the copy register group 24.

The CPU 20 may output the reset command to set the reset flag to 1 to the SerDes control unit 22 in each copy cycle and the controller 52 may directly output the reset signal to the address counter 66 in response to the reset command.

In the input/output control register group 32, similarly, the set value for validating or invalidating the timer 96 which is stored in the control register 98 is set to "valid" and the time interval at which the timer 96 outputs the reset signal is set to be equal to the copy cycle such that the address counter of the input/output control register group 32 is periodically reset. The timer 96 operates according to the set value which is set to the control register 98 and outputs the reset signal to the address counter 94 at the set time interval (for example, at each copy start time). When receiving the reset signal, the address counter 94 is reset.

(3) Method of Transmitting Reset Packet for Resetting Address Counter 66 of Main Control Unit 12 from Apparatus Control Unit 14

The controller 80 of the apparatus control unit 14 generates a reset packet for resetting the address counter 66 using the packet generation circuit 88, the buffer 90, and the parallel-serial conversion circuit 92 and transmits the reset packet to the main control unit 12. The reset packet may be generated after all data is read from the input/output control register group 32 and then transmitted, or it may be generated immediately before the first data item is read from the input/output control register group 32 and then transmitted. When receiving the reset packet, the controller 52 of the main control unit 12 outputs the reset signal to the address counter 66.

FIGS. 12A and 12B show examples of the timing charts when method (3) is used. FIG. 12A shows an example of the timing chart when the input/output control register group 32 and the copy register group 24 have the same size. FIG. 12B shows an example of the timing chart when the size of the input/output control register group 32 is less than that of the copy register group 24.

Method (1) or (2) may be used to reset the address counter 94 of the apparatus control unit 14.

(4) Method of Inserting Code Indicating First Copy Packet into Copy Packet for Transmitting Data (First Data) for Start Address to Reset Main Control Unit 12

In this method, a code indicating the copy packet of the first data item is inserted into the copy packet of the first data item among the copy packets transmitted from the apparatus control unit 14. When receiving the copy packet, the controller 52 outputs the reset signal to the address counter 66 before writing in a new copy cycle using the copy packet starts. The code may be inserted using the remaining bits of the copy packet.

Figures 13A, 13B:
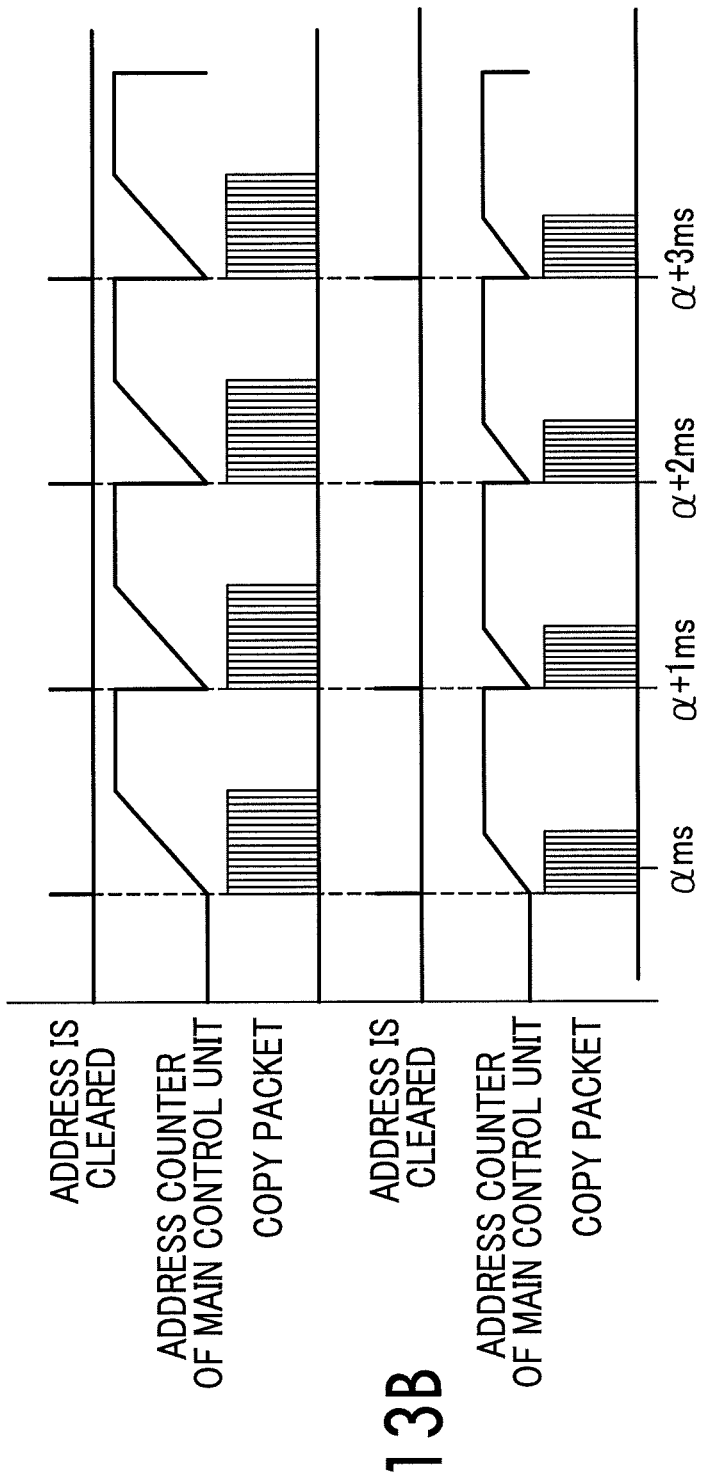
FIGS. 13A and 13B are timing charts illustrating the reset time of the address counter of the main control unit when method (4) is used in the third exemplary embodiment.

FIGS. 13A and 13B show examples of the timing charts when method (4) is used. FIG. 13A shows an example of the timing chart when the input/output control register group 32 and the copy register group 24 have the same size. FIG. 13B shows an example of the timing chart when the size of the input/output control register group 32 is less than that of the copy register group 24.

Method (1) or (2) may be used to reset the address counter 94 of the apparatus control unit 14.

(5) Method of Inserting Code Indicating Last Copy Packet into Copy Packet for Transmitting Data (Last Data) End Address to Reset Main Control Unit 12

In this method, a code indicating the copy packet of final data is inserted into the copy packet of the final data among the copy packets transmitted from the apparatus control unit 14. The controller 52 receives the copy packet and writes the final data. Then, the controller 52 outputs the reset signal to the address counter 66 before writing starts in the next copy cycle. The code may be inserted using the remaining bits of the copy packet.

Figure 14A:
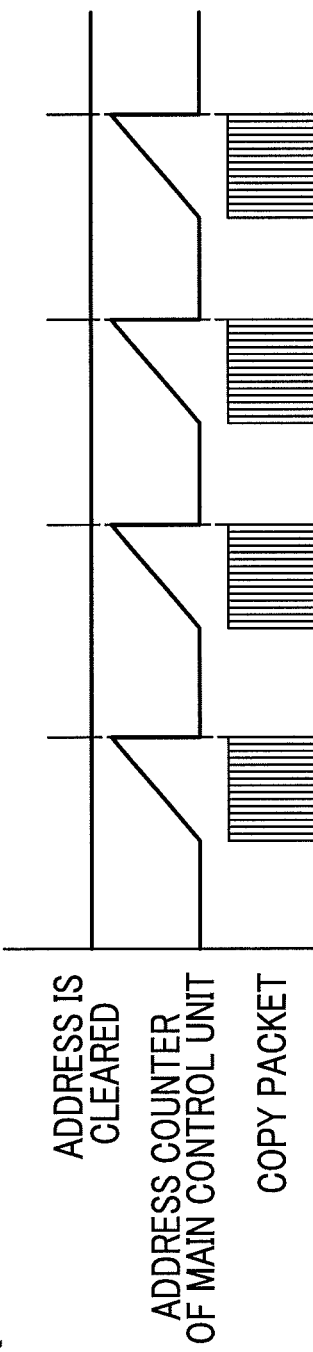
FIGS. 14A and 14B are timing charts illustrating the reset time of the address counter of the main control unit when method (5) is used in the third exemplary embodiment.
Figure 14B:
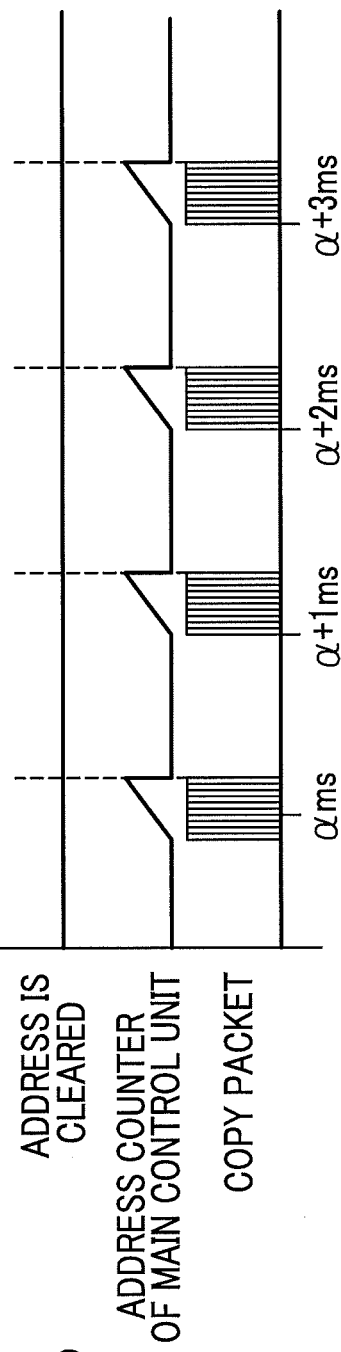

FIGS. 14A and 14B show examples of the timing charts when method (5) is used. FIG. 14A shows an example of the timing chart when the input/output control register group 32 and the copy register group 24 have the same size. FIG. 14B shows an example of the timing chart when the size of the input/output control register group 32 is less than that of the copy register group 24.

Method (1) or (2) may be used to reset the address counter 94 of the apparatus control unit 14.

(6) Method of Inserting Code Indicating Size of Input/Output Control Register Group 32 into Copy Packet Transmitted from Apparatus Control Unit 14 and Resetting Main Control Unit 12 According to Size.

In this method, a code indicating the size of input/output control register group 32 is inserted into the copy packet of, for example, the first data item among the copy packets transmitted from the apparatus control unit 14 and the copy packet is transmitted to the main control unit 12. The code may be inserted using the remaining bits of the copy packet. For example, as shown in FIGS. 15C, a 2-bit code corresponding to the memory size of the input/output control register group 32 is inserted into the remaining bits of the copy packet.

When receiving the copy packet, the controller 52 of the main control unit 12 acquires the size of the input/output control register group 32 with reference to the bits inserted into the copy packet. Then, the controller 52 outputs the reset signal when the address (count value) output from the address counter 66 reaches a value corresponding to the acquired size.

FIGS. 15A and 15B show examples of the timing charts when method (6) is used. FIG. 15A shows an example of the timing chart when the input/output control register group 32 and the copy register group 24 have the same size. FIG. 15B shows an example of the timing chart when the size of the input/output control register group 32 is less than that of the copy register group 24.

Method (1) or (2) may be used to reset the address counter 94 of the apparatus control unit 14.

Methods (1) to (6) have been described above. At least two of methods (1) to (6) may be combined to reset the address counter 66 and the address counter 94. In addition, the main control unit 12 and the apparatus control unit 14 may use different reset methods.

When the main control unit 12 uses a method which does not use the timer 70, the timer 70 shown in FIG. 8 is not needed. When the apparatus control unit 14 uses a method which does not use the timer 96, the timer 96 shown in FIG. 9 is not needed.

When the main control unit 12 uses a method which does not use the control register 72, the control register 72 shown in FIG. 8 is not needed. When the apparatus control unit 14 uses a method which does not use the control register 98, the control register 98 shown in FIG. 9 is not needed.

In the related art, when an error occurs during writing and writing is performed in wrong order (the address is wrong), the only way to recover the system is a system reset. However, in this embodiment, a mechanism for resetting the address counter 66 of the copy register group 24 and a mechanism for resetting the address counter 94 of the input/output control register group 32 are provided to recover the system, without performing a system reset.

Even when the copy register group 24 of the main control unit 12 and the input/output control register group 32 of the apparatus control unit 14 are memory areas with different sizes, an increase in the amount of data communication is prevented and an increase in the circuit size of the apparatus control unit 14 is prevented.

Figure 16:
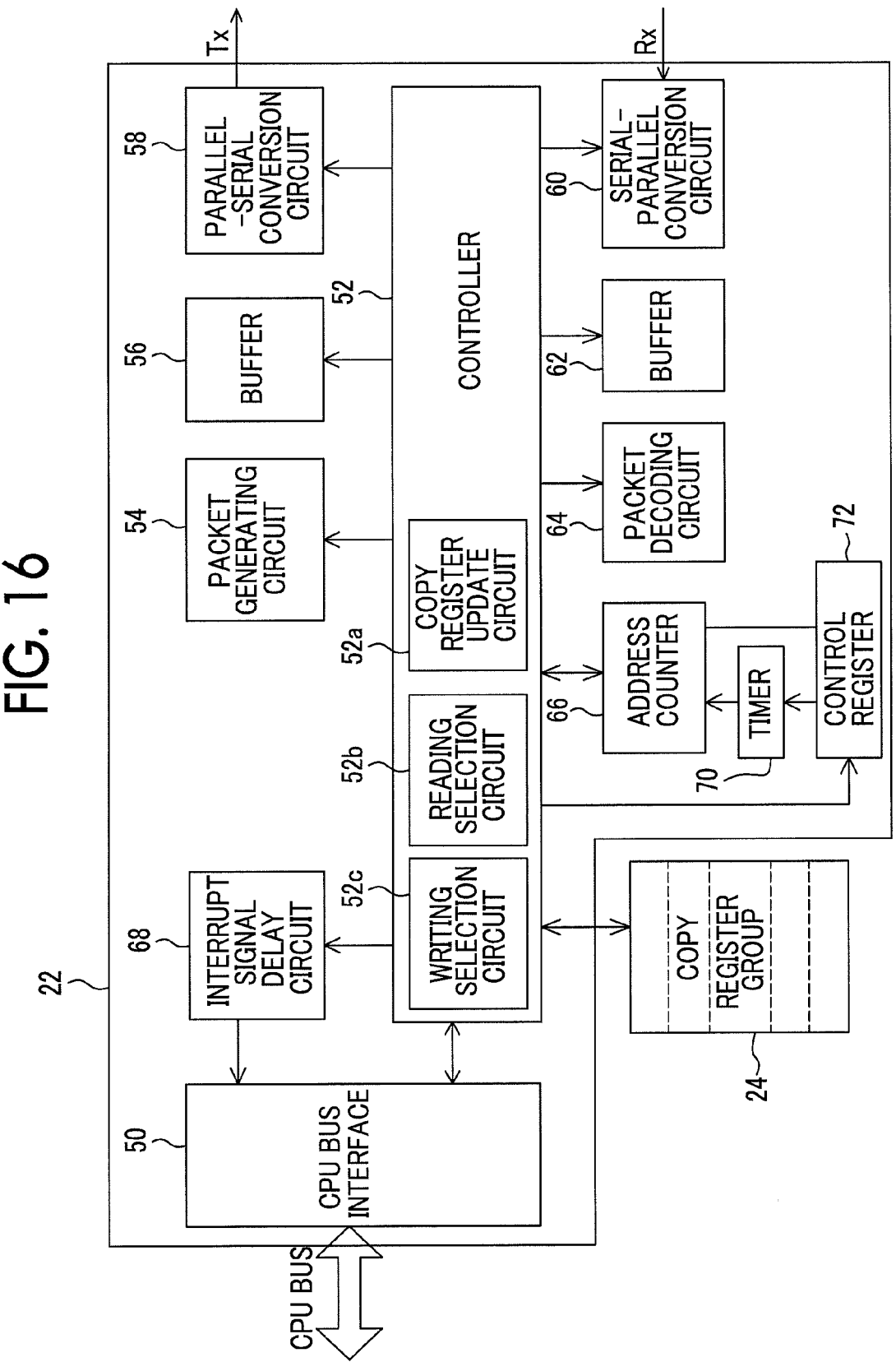
FIG. 16 is a diagram illustrating another example of the structure of the SerDes control unit of the main control unit.

As shown in FIG. 16, the control device 11 described in the first exemplary embodiment may include the structure for generating the interrupt signals while delaying the interrupt signals which has been described in the second exemplary embodiment and the structure for resetting the address counter 66 which has been described in the third exemplary embodiment.

In each of the above-described exemplary embodiments, the control device is applied to the image forming apparatus, but the invention is not limited thereto. For example, the control device may be applied to various devices which control the driving of various apparatuses other than the image forming apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A control device comprising:
   a first controller that is connected to at least one apparatus and includes a first memory that stores data for controlling the driving of the at least one apparatus and data indicating a state of the at least one apparatus;
   a second controller that is connected to a bus of a central processing unit and includes a second memory to which data is copied from the first memory; and
   a full-duplex serial bus that connects the first controller and the second controller,
   wherein the second controller reads the data which is copied in the second memory and supplies the data which is read from the second memory to the central processing unit when the second controller receives a read request to read data of the first memory from the central processing unit.

2. The control device according to claim 1,
   the first controller further including:
   a reading and transmitting unit which reads each data item stored in the first memory and transmits the read data,
   the second controller further including:
   a writing unit which writes the data transmitted from the first controller to the second memory,
   wherein the reading and transmitting unit and the writing unit operate such that each data item stored in the first memory is read from the first memory, transmitted, and stored in the second memory in a cycle equal to or less than a count cycle of a system timer, which is a standard for the operation of the central processing unit.

3. The control device according to claim 1,
   wherein the first controller generates a plurality of packets from data items which are sequentially read from an initial address stored in the first memory, without designating a write destination address of each data item, and transmits the plurality of packets, and
   the second controller writes data from an initial address of the second memory in an order in which the plurality of packets are transmitted.

4. The control device according to claim 1,
   the second controller further including:
   a detecting unit that detects a start and an end of the writing of data to the second memory, and
   a notification unit that notifies the central processing unit of an interrupt occurrence when the detecting unit detects the start and the end of the writing of data after an interrupt packet is received.

5. A first controller comprising:
   a first connecting portion that is connected to at least one apparatus;
   a second connecting portion that is connected to a second controller via a full-duplex serial bus; and
   a first memory which stores data for controlling the driving of the at least one apparatus and data indicating a state of the at least one apparatus;
   wherein the second controller is connected to a bus of a central processing unit and includes a second memory to which data is copied from the first memory,
   wherein the second controller reads the data which is copied in the second memory and supplies the data which is read to the central processing unit when receiving a read request to read data of the first memory from the central processing unit.

6. A second controller comprising:
   a first connecting portion connected to a first controller via a full-duplex serial bus;
   a second connecting portion that is connected to a bus of a central processing unit; and
   a second memory to which data is copied from a first memory,
   wherein the first controller is connected to at least one apparatus and includes the first memory, the first memory storing data for controlling the driving of the at least one apparatus and data indicating a state of the at least one apparatus,
   wherein the second controller reads the data which is copied in the second memory and supplies the data which is read to the central processing unit when receiving a read request to read data of the first memory from the central processing unit.

* * * * *